(12) United States Patent
Tsuji et al.

(10) Patent No.: US 7,400,144 B2
(45) Date of Patent: Jul. 15, 2008

(54) MAGNETIC RESONANCE FORCE MICROSCOPE

(75) Inventors: Shigenori Tsuji, Tokyo (JP); Yohsuke Yoshinari, Tokyo (JP); Masahiro Shirakawa, Kyoto (JP); Tetsuro Kobubo, Kanagawa (JP)

(73) Assignee: Jeol Ltd., Tokyo (JP)

( * ) Notice: Subject to any disclaimer, the term of this patent is extended or adjusted under 35 U.S.C. 154(b) by 0 days.

(21) Appl. No.: 11/712,840

(22) Filed: Mar. 1, 2007

(65) Prior Publication Data

US 2007/0216412 A1 Sep. 20, 2007

(30) Foreign Application Priority Data

Mar. 1, 2006 (JP) ............................. 2006-055443

(51) Int. Cl.
  *G01V 3/00* (2006.01)
  *G01B 5/28* (2006.01)
(52) U.S. Cl. ..................... 324/300; 324/304; 73/105
(58) Field of Classification Search ............... 324/300, 324/304; 73/105; 250/234, 306
  See application file for complete search history.

(56) References Cited

U.S. PATENT DOCUMENTS

| 5,266,896 A | | 11/1993 | Rugar et al. |
| 5,585,722 A | * | 12/1996 | Hosoki et al. ............... 324/318 |
| 6,181,131 B1 | * | 1/2001 | Bruland et al. .............. 324/300 |
| 6,249,000 B1 | * | 6/2001 | Muramatsu et al. ......... 250/306 |
| 7,305,869 B1 | * | 12/2007 | Berman et al. ............... 73/105 |

OTHER PUBLICATIONS

William H. Press, Saul A. Teukolsky, William T. Vetterling and Brian P. Plannery, "Numerical Recipes in C: The Art of Scientific Computing," Cambridge University Press, 1988, pp. 538-545.
T.R. Albrecht, P. Grütter, D. Horne and D. Rugar, "Frequency modulation detection using high-$Q$ cantilevers for enhanced force microscope sensitivity," *J. Appl. Phys.*, vol. 69, No. 2, Jan. 15, 1991, pp. 668-673.
O. Zügar and D. Rugar, "Magnetic resonance detection and imaging using force microscope techniques (invited)," *J. Appln. Phys.*, vol. 75, No. 10, May 15, 1994, pp. 6211-6216.
K.J. Bruland, J. Krzystek, J.L. Garbini and J.A. Sidles, "Anharmonic modulation for noise reduction in magnetic resonance force microscopy," *Rev. Sci. Instrum.*, vol. 66, No. 4, Apr. 1995, pp. 2853-2856.
O. Zügar, S.T. Hoen, C.S. Yannoni and D. Rugar, "Three-dimensional imaging with a nuclear magnetic resonance force microscope," *J. Appl. Phys.*, vol. 79, No. 4, Feb. 15, 1996, pp. 1881-1884.
Ernst Meyer, Hans Josef Hug, and Roland Bennewitz, "Scanning Probe Microscopy, The Lab on a Tip," Springer-Verlag (2004), pp. 81-83.

* cited by examiner

*Primary Examiner*—Louis M Arana
(74) *Attorney, Agent, or Firm*—The Webb Law Firm

(57) ABSTRACT

A magnetic resonance force microscope (MRFM) generator for producing an RF magnetic field uniformly over the whole of a sample. A cantilever with magnetic probe tip is self-excited. Under this condition, spins in the sample are controlled to produce a magnetic resonance force. A frequency demodulator measures the resonant frequency of the cantilever from the output detection signal from a cantilever displacement-measuring instrument based on the magnetic resonance force.

12 Claims, 22 Drawing Sheets

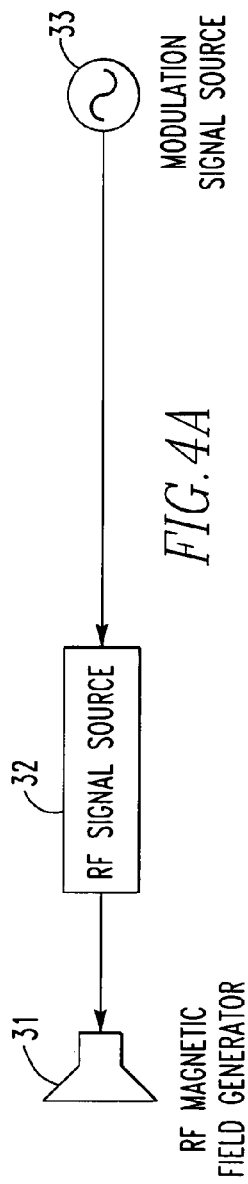
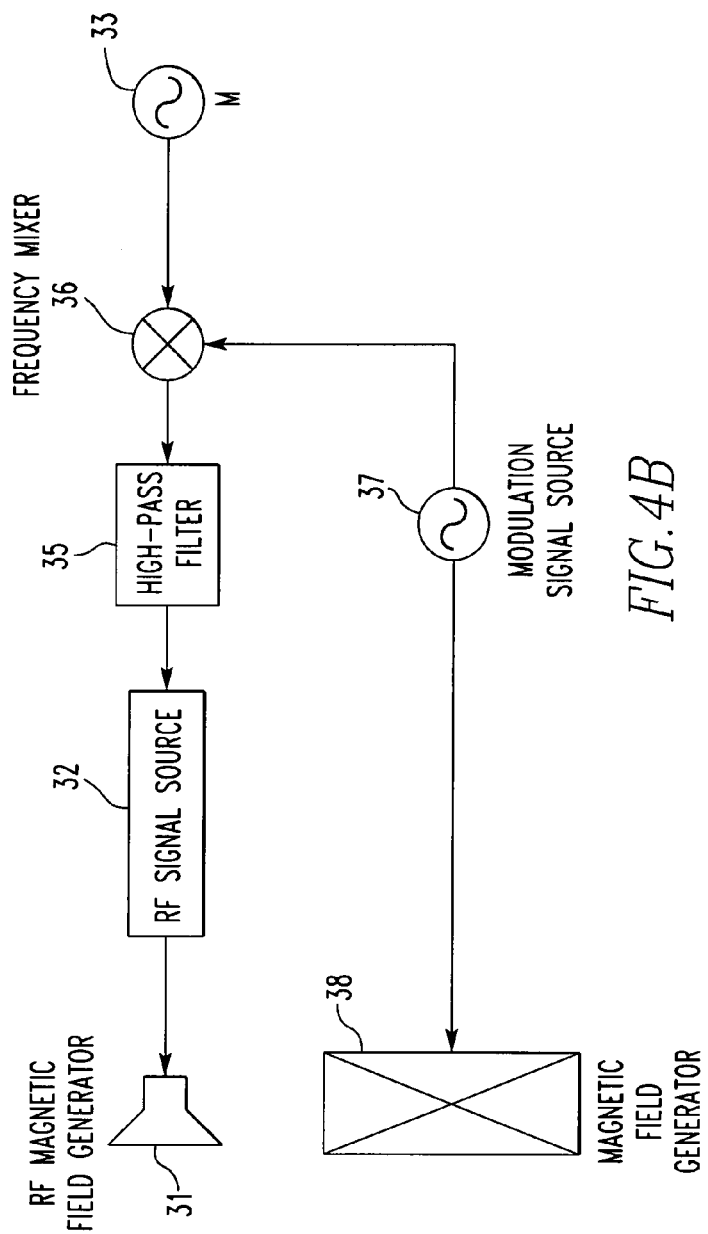

ically small samples, such as a single gene, proteins, and biological molecules. MRFM apparatus are currently being developed by some groups and are in a developmental stage. It is said that the highest spatial resolution attained today is 20 nm. MRFM is described in U.S. Pat. No. 5,266,896; Japanese Patent Publication No. H7-69289; Proceedings of the Magnetic Society of Japan, Vol. 22, No. 1, p. 19 (1998); and Journal of Applied Physics, Vol. 79, p. 1881 (1996)
MAGNETIC RESONANCE FORCE MICROSCOPE

BACKGROUND OF THE INVENTION

1. Field of the Invention

The present invention relates to a magnetic resonance force microscope (MRFM) for performing magnetic resonance force imaging of a sample.

2. Description of Related Art

A magnetic resonance force microscope (MRFM) is an instrument that combines the techniques of a magnetic resonance imaging (MRI) instrument using a magnetic resonance technology that is a conventional technology with the techniques of an atomic force microscope (AFM) capable of imaging atoms on sample surfaces. It is anticipated that the MRFM is an MRI instrument producing a spatial resolution at atomic level. The purpose of the utilization is defined to be a quantitative analysis consisting chiefly of imaging and analyzing three-dimensional structures of extremely small samples, such as a single gene, proteins, and biological molecules. MRFM apparatus are currently being developed by some groups and are in a developmental stage. It is said that the highest spatial resolution attained today is 20 nm. MRFM is described in U.S. Pat. No. 5,266,896; Japanese Patent Publication No. H7-69289; Proceedings of the Magnetic Society of Japan, Vol. 22, No. 1, p. 19 (1998); and Journal of Applied Physics, Vol. 79, p. 1881 (1996)

FIG. 1 schematically shows the configuration of an MRFM apparatus consisting of laser light passed through an optical fiber 1, a cantilever 2 receiving the laser light, and a sample stage 3 on which a sample 4 is placed. The stage 3 operates as a scanner. Meanwhile, elements necessary for magnetic resonance include an RF (radio-frequency) coil 5 and an external static magnetic field (not shown). A magnetic field gradient indispensable for MRI (magnetic resonance imaging) is produced by a magnetic field that is quite inhomogeneous spatially. This inhomogeneous field is set up by a magnetic tip 6 that is mounted at the tip of the cantilever 2 and made of a magnetic material (including a permanent magnet) with high magnetic permeability.

The operation of the MRFM apparatus is now described. A magnetic resonance phenomenon within the MRFM apparatus is produced when resonant conditions are satisfied. The resonant conditions are uniquely determined by the relationship between a static magnetic field inside the sample and the frequency of the RF magnetic field applied by the RF coil 5. The static magnetic field inside the sample is defined to be the sum of the externally applied magnetic field and the magnetic field produced by the magnetic tip 6.

When the resonant conditions do not hold, the cantilever 2 feels a magnetic field given by the product of the magnetization of the sample polarized by the aforementioned static magnetic field and the magnetic field gradient produced by the magnetic tip 6, and has been displaced from the position assumed in the thermal equilibrium state that is defined when neither magnetic field nor magnetic field gradient is present.

When the resonant conditions hold, the reduced polarization magnetization weakens the magnetic force, forcing the cantilever 2 to return toward the position assumed in the thermal equilibrium state. The variation in the magnetic force produced at this time is referred to as a magnetic resonance force.

The physical quantity measured in MRFM is this amount of displacement of the amplitude of the cantilever. The amount of displacement is measured using an optical interferometer or optical beam deflection. A distribution of the intensities of magnetic resonance forces at various locations can be obtained by scanning the relative position of the magnetic tip 6 to the sample 4. A real space image is reproduced by computer-processing the distribution of the intensities of the magnetic resonance forces while taking account of known magnetic field distributions and magnetic field gradient distributions.

MRI can measure a three-dimensional distribution of the numbers of electron spins or certain atomic nuclear spins or magnitudes of spin magnetizations at positions inside a sample. However, if an MRI image is obtained by imaging only a portion containing spins of interest, it may not be possible to locate the position of this portion within the whole sample or to identify to what tissue that portion belongs.

FIG. 2A is a view of a sample 4 placed on the surface of the scanner (sample stage), as viewed from a direction perpendicular to the surface. It is assumed that the sample 4 is made of some materials that are different in composition and morphology. It is also assumed that spins capable of being observed by MRI are contained only in a portion 8 indicated by arrow 7.

FIG. 2B is an image 8' that would be acquired when the sample 4 is imaged by MR. It is now assumed that the user wants to provide an estimate from an MRI image alone as to where the portion producing the image is located within the sample. For this purpose, it is necessary to grasp the shapes of the individual components of the material in advance. Furthermore, to allow the user to correlate these shapes with the obtained MRI image and to make a choice, the MRI image must reveal a particular shape or contain a characteristic portion representing the sample 4.

Comparison of FIGS. 2B and 2B makes it possible to conclude that any one of the six horizontally elongated materials 8-13 is contained in the sample 4 in FIG. 2A. However, it is impossible to determine which one of them is exactly responsible. That is, there remains room for improvement for understanding of MRI images.

If an image of the whole sample taken in the same field of view of an MRI image irrespective of the presence or absence of spins of interest is derived, in addition to the MRI image, the MRI image can be understood more deeply.

FIG. 2C shows an image that is anticipated to be acquired when the sample is imaged by such an imaging technique. It is also assumed that the field of view and the observer's eye are identical with their counterparts in FIG. 2B. If an image as shown in FIG. 2C is obtained, it is possible to locate the position of the portion 8' imaged as shown in the FIG. 2B within FIG. 2C by superimposing the obtained image on the image of FIG. 2B.

SUMMARY OF THE INVENTION

The present invention has been made in view of the foregoing circumstances. It is an object of the present invention to provide a magnetic resonance force microscope permitting one to understand MRI images more deeply.

A magnetic resonance force microscope according to one embodiment of the present invention comprises: (A) a cantilever having a probe at its tip and acting to detect a displacement distance based on an interaction produced between the probe and a local portion of a sample; (B) a scanner for scanning the sample relative to the probe of the cantilever, the sample being placed on the scanner; (C) a cantilever displacement-measuring portion for converting the displacement distance of the cantilever into an electrical signal; (D) a cantilever self-excitation loop portion for self-exciting the cantilever according to an output signal (detection signal) from the cantilever displacement-measuring portion; (E) an RF magnetic field-producing portion for producing a homogeneous RF magnetic field over the whole of the sample scanned relative to the probe by the scanner; (F) an RF signal source for causing the RF magnetic field-producing portion to produce an RF signal having a frequency adapted to excite magnetic resonance in the sample present within the magnetic field and to modulate the RF signal periodically; (G) a modulation signal source for supplying the periodically modulated signal to the RF signal source; (H) a frequency demodulation portion for (i) controlling spins in the sample to produce a magnetic resonance force while the cantilever self-excitation loop portion is self-exciting the cantilever within the RF magnetic field produced uniformly over the whole of the sample by the RF magnetic field-producing portion in response to the periodically modulated RF signal that is produced by the RF signal source based on the periodically modulated signal supplied from the modulation signal source, (ii) measuring the resonant frequency of the cantilever from the output signal from the cantilever displacement-measuring portion based on a gradient of the magnetic resonance force, and (iii) measuring a shift of the resonant frequency of the cantilever; (I) an atomic force imaging portion for controlling the scanner such that the DC component $\Delta v$ of the amount of shift of the resonant frequency of the cantilever is kept constant to adjust the distance Z from the surface of the sample to the tip of the probe and to create an atomic force microscope (AFM) image of the sample; and (J) a magnetic resonance force imaging portion for creating a magnetic resonance force microscope (MRFM) image according to the AC component $\delta v$ of the amount of shift of the resonant frequency of the cantilever in the frequency demodulation portion.

The above-described object is also achieved by a magnetic resonance force microscope built according to another embodiment of the present invention and acting to perform magnetic resonance force imaging of a sample, the microscope preferably comprising: (A) a cantilever having a probe at its tip and acting to detect a displacement distance based on an interaction produced between the probe and a local portion of the sample; (B) a scanner for scanning the sample relative to the probe of the cantilever, the sample being placed on the scanner; (C) a cantilever displacement-measuring portion for converting the displacement distance of the cantilever into an electrical signal; (D) a cantilever excitation portion for exciting the cantilever according to an output signal (detection signal) from the cantilever displacement-measuring portion; (E) an RF magnetic field-producing portion for producing a homogeneous RF magnetic field over the whole of the sample scanned relative to the probe by the scanner; (F) an RF signal source for causing the RF magnetic field-producing portion to produce an RF signal having a frequency adapted to excite magnetic resonance in the sample present within the magnetic field and to modulate the RF signal periodically; (G) a modulation signal source for supplying the periodically modulated signal to the RF signal source; (H) a phase detector for (i) controlling spins in the sample to produce a magnetic resonance force while the cantilever excitation portion is exciting the cantilever within the RF magnetic field produced uniformly over the whole of the sample by the RF magnetic field-producing portion in response to the periodically modulated RF signal that is produced by the RF signal source based on the periodically modulated signal supplied from the modulation signal source and (ii) measuring a phase shift of the cantilever from the output signal from the cantilever displacement-measuring portion based on a gradient of the magnetic resonance force; (I) an atomic force imaging portion for controlling the scanner such that the DC component $\Delta \phi$ of the phase shift of the cantilever is kept constant to adjust the distance Z from the surface of the sample to the tip of the probe and to create an atomic force microscope (AFM) image of the sample; and (J) a magnetic resonance force imaging portion for creating a magnetic resonance force microscope (MRFM) image according to the phase modulation intensity $\delta \phi$ of the cantilever in the frequency demodulation portion.

A magnetic resonance force microscope according to a further embodiment of the present invention preferably comprises: (A) a cantilever having a probe at its tip and acting to detect a displacement distance based on an interaction produced between the probe and a local portion of a sample; (B) a scanner for scanning the sample relative to the probe of the cantilever, the sample being placed on the scanner; (C) a cantilever displacement-measuring portion for converting the displacement distance of the cantilever into an electrical signal; (D) a cantilever excitation portion for exciting the cantilever according to an output signal (detection signal) from the cantilever displacement-measuring portion; (E) an RF magnetic field-producing portion for producing a homogeneous RF magnetic field over the whole of the sample scanned relative to the probe by the scanner; (F) an RF signal source for causing the RF magnetic field-producing portion to produce an RF signal having a frequency adapted to excite magnetic resonance in the sample present within the magnetic field and to modulate the RF signal periodically; (G) a modulation signal source for supplying the periodically modulated signal to the RF signal source; (H) a phase detector for (i) controlling spins in the sample to produce a magnetic resonance force while the cantilever excitation portion is exciting the cantilever within the RF magnetic field produced uniformly over the whole of the sample by the RF magnetic field-producing portion in response to the periodically modulated RF signal that is produced by the RF signal source based on the periodically modulated signal supplied from the modulation signal source and (ii) measuring a phase shift of the oscillation of the cantilever from the output signal from the cantilever displacement-measuring portion based on the magnetic resonance force; (I) an atomic force imaging portion for controlling the scanner such that the DC component $\Delta \phi$ of the phase shift of the cantilever is kept constant to adjust the distance Z from the surface of the sample to the tip of the probe and to create an atomic force microscope (AFM) image of the sample; and (J) a magnetic resonance force imaging portion for creating a magnetic resonance force microscope (MRFM) image according to a phase modulation intensity $\delta \phi$ of the cantilever in the frequency demodulation portion.

In one aspect of the present invention, an SPM (scanning probe microscope) probe mounted to the tip of the cantilever is used to take an atomic force microscope image and a magnetic resonance force microscope image of the sample with the same field of view.

In another feature of the invention, an SPM probe having both functions adapted for an atomic force microscope and functions adapted for a magnetic resonance force microscope is used.

The output signal from the probe of the scanning probe microscope has any one of the following features: (1) The component of the frequency of the signal that does not vary in time is a signal indicating an atomic force microscope image and the component that varies in time is a signal indicating a magnetic resonance force microscope image; (2) The component of the phase of the signal that does not vary in time is a signal indicating an atomic force microscope image and the component that varies in time is a signal indicating a magnetic resonance force microscope image; and (3) The component of the phase of the signal that does not vary in time is a signal indicating an atomic force microscope image and the component that varies in time is a signal indicating a magnetic resonance force microscope image.

The present invention can offer an MRI image only of a portion containing spins of interest by an MRI technique that can include the prior-art magnetic resonance force microscopy (MRFM). It can also be expected that the MRI image will be understood more deeply if an image of the whole sample taken with the same field of view irrespective of whether there are spins of interest is obtained, in addition to the MRI image.

That is, in the present invention, a probe capable of producing and detecting MRFM signal and AFM signal is used. One signal derived from the probe can be separated into two kinds of signals. Because of these features, a superimposed image can be obtained. The superimposed image that is a superimposition of the MRFM image and AFM image that can be taken with the same field of view can be offered.

Other objects and features of the invention will appear in the course of the description thereof, which follows.

BRIEF DESCRIPTION OF THE DRAWINGS

FIGS. 4A and 4B are diagrams of a structure used when a modification to two modulation systems (i.e., magnetic modulation (HM) and RF modulation) is made;

DESCRIPTION OF THE PREFERRED EMBODIMENTS

Figure 1:
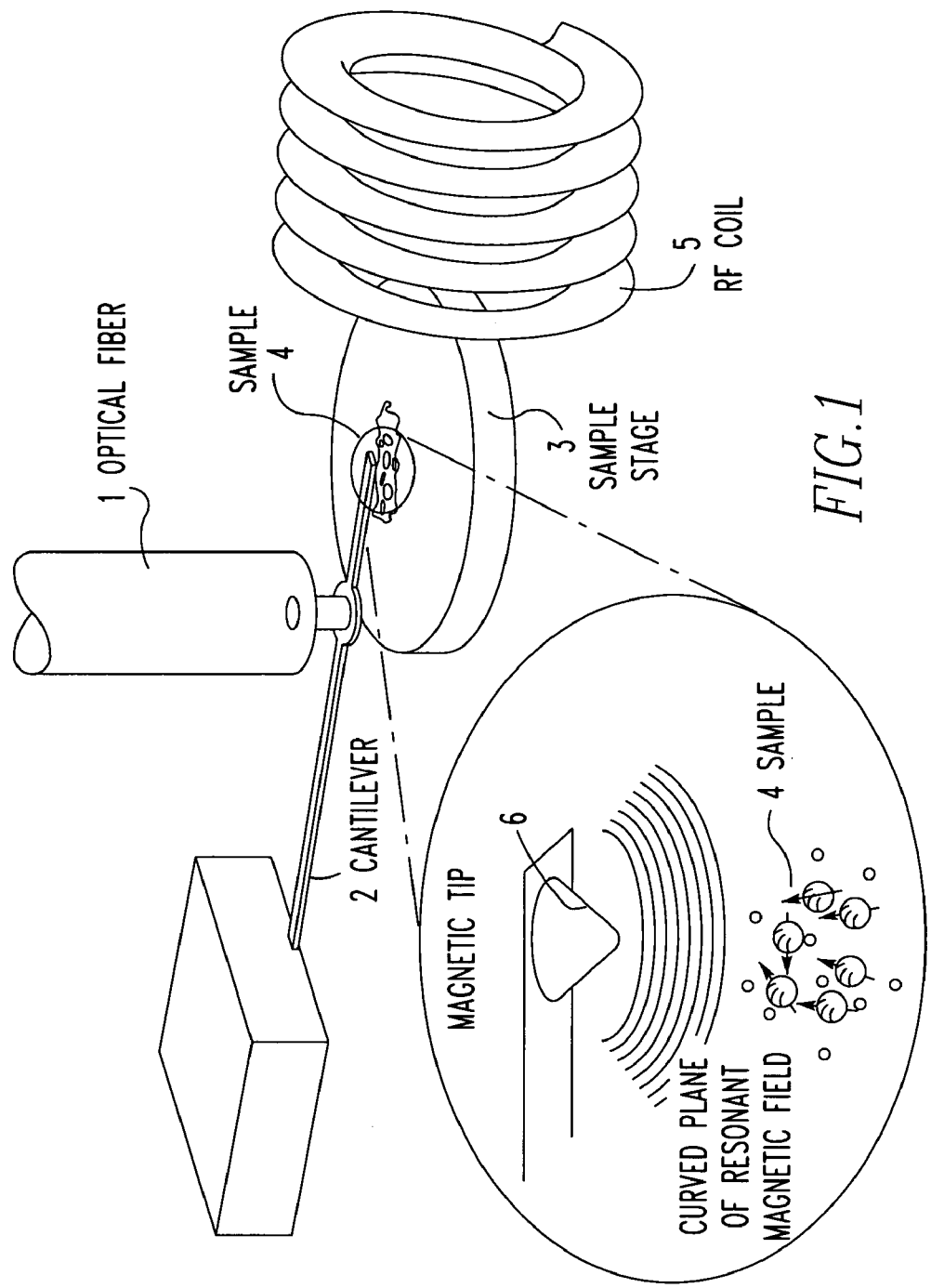
FIG. 1 is a schematic perspective view of an MRFM apparatus.
Figure 2C:
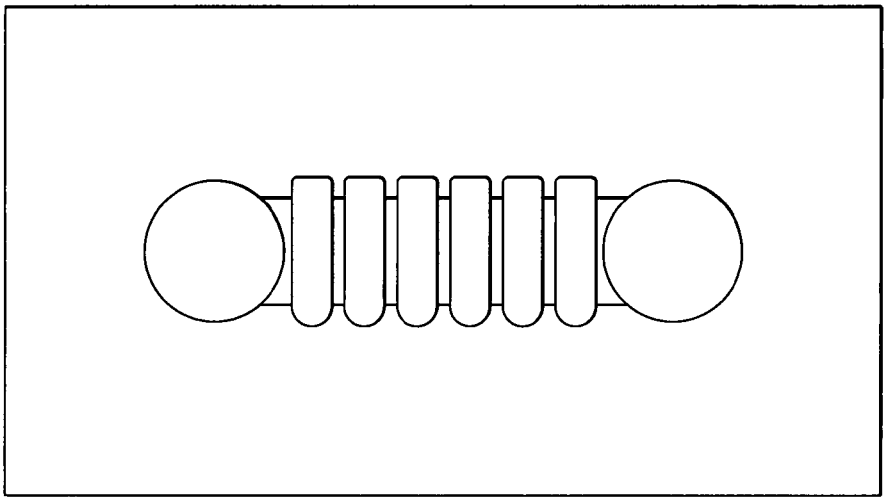
FIGS. 2A, 2B and 2C are diagrams illustrating the problems with the prior art technique.
Figure 2B:
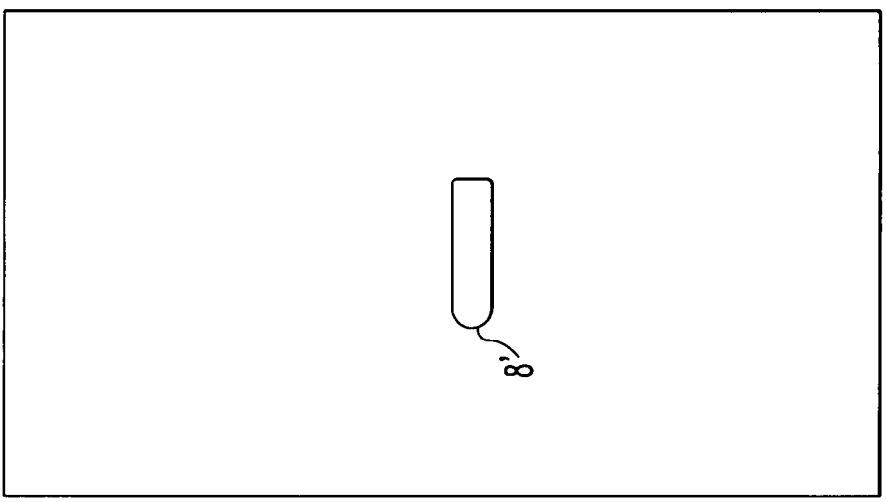
Figure 2A:
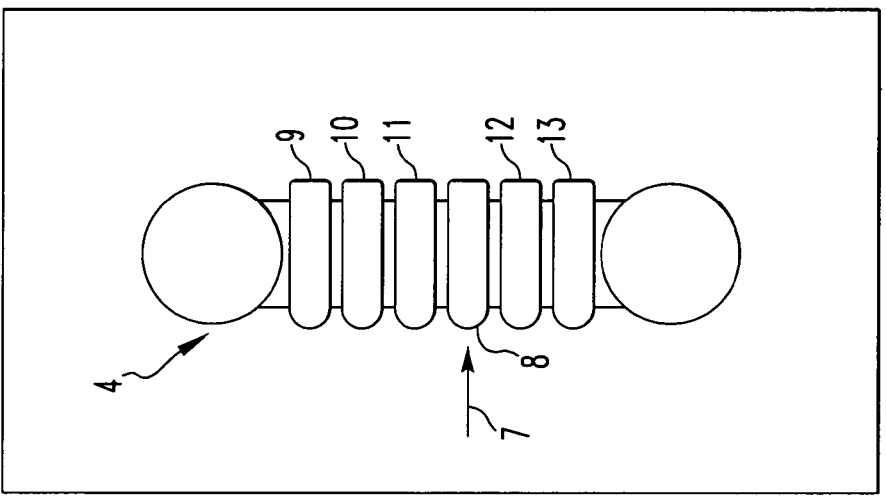

Some preferred embodiments of the present invention are hereinafter described. These embodiments provide a magnetic resonance force microscopes (MRFMs) that produce an AFM (atomic force microscope) image and an MRFM (magnetic resonance force microscope) image of a sample with the same field of view. Such a magnetic resonance force microscope makes it possible to obtain an image of the whole sample with the same field of view irrespective of the presence or absence of spins of interest, in addition to an MRI image. Consequently, the MRI image can be understood more deeply.

In these embodiments, a method of producing and detecting two kinds of signals can be implemented in the following three embodiments. In Embodiment 1, a component (AFM signal) of the frequency of an AC signal which does not vary in time and a component (MRFM signal) which varies in time are used. In Embodiment 2, a component (AFM signal) of the phase of an AC signal which does not vary in time and a component (MRFM signal) which varies in time are used. In Embodiment 3, a component (AFM signal) of the phase of an AC signal which does not vary in time and a component (MRFM signal) which varies in time are used.

Embodiment 1

Embodiment 1 in which a superimposition of an atomic force microscope (AFM) image and a magnetic resonance force microscope (MRFM) image is obtained is first described.

The measured AFM image is a trace of the probe scanned on the surface of the sample, the trace being made while controlling the distance between the probe and the surface of the sample such that the resonant frequency of the cantilever is kept constant. The method of obtaining this image is based on a non-contact FM detection method that is a general method in atomic force microscopy. A draft version of the FM detection method is described by T. R. Albrecht, P. Gruetter, D. Home and D. Rugar, "Frequency modulation detection using high-Q cantilevers for enhanced force microscope sensitivity", *J. Appl. Phys.* 69 (1991), pp. 668-673. The amount of shift Δv of the resonant frequency of the cantilever is in proportion to the gradient of the force applied to the cantilever as given by Eq. (1).

$$\frac{\delta v}{v_0} = -\frac{1}{2k}\frac{\partial F_\alpha}{\partial \alpha} \quad (1)$$

where α indicates the direction of oscillation of the cantilever.

Therefore, in the image derived by this method, a curved plane on which the gradient of the force produced between the probe and the surface of the sample is constant is drawn.

The measured MRFM image is next described briefly. Spins in the sample are controlled by a magnetic resonance technique, and a magnetic resonance force is produced. If the force gradient is varied periodically, the resonant frequency of the cantilever is modulated with modulation intensity δv in accordance with Eq. (1). The MRFM image is obtained by appropriately image-processing a distribution of modulation intensities (distribution of magnetic resonance forces) after deriving the distribution by scanning the scanner.

The shift of the resonant frequency of the cantilever observed at each point provides a signal whose DC component Δv (component not dependent on time) is related to AFM. The AC component δv (component varying periodically in time) is related to MRFM. The components and operation of a magnetic resonance force microscope used to measure the shift of the resonant frequency of the cantilever which is observed at each point are described below.

Figure 3:
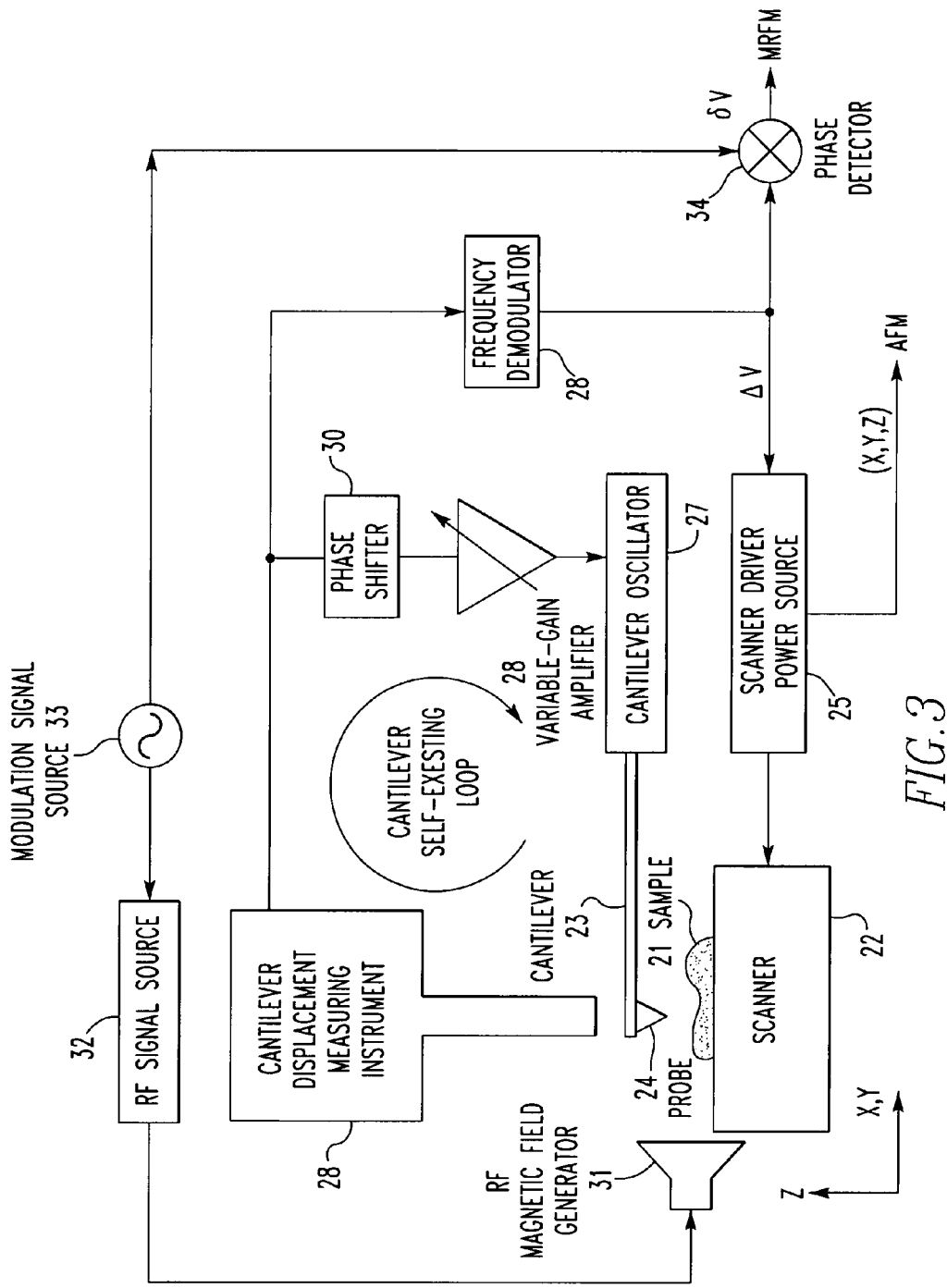
FIG. 3 is a block diagram of a magnetic resonance force microscope according to Embodiment 1.

FIG. 3 is a block diagram of the magnetic resonance force microscope. This apparatus according to Embodiment 1 is used to obtain images of magnetic resonance forces in the sample. The apparatus has a probe 24 at its tip. Furthermore, the apparatus has a cantilever 23 for detecting the displacement distance produced based on an interaction produced between the probe 24 and a local portion of a sample 21, a scanner 22 for scanning the sample 21 placed on the scanner relative to the probe 24 of the cantilever 23, a cantilever displacement-measuring instrument 29 for converting the displacement distance of the cantilever 23 into an electrical signal, a cantilever self-excitation loop portion for self-exciting the cantilever 23 according to the output signal from the cantilever displacement-measuring instrument 29, an RF magnetic field generator 31 for producing a uniform RF magnetic field over the whole sample that is scanned relative to the probe by the scanner 22, an RF signal source 32 causing the magnetic field generator 31 to produce an RF signal which has a frequency adapted for excitation of magnetic resonance in the sample 21 within the magnetic field and to periodically modulate the RF signal, a modulation signal source 33 for supplying the periodically modulated signal to the RF signal source 32, a frequency demodulator 26, a scanner driver power source 25 acting as an atomic force imaging portion, and a phase detector 34 acting as a magnetic resonance force imaging portion. The frequency demodulator 26 measures the resonant frequency and the resonant frequency shift of said cantilever 23 while the cantilever self-excitation loop portion is self-exciting the cantilever 23 in the RF magnetic field produced uniformly over the whole sample 21 by the RF magnetic field generator 31 in response to the RF signal which is produced and periodically modulated by the RF signal source 32 according to the periodically modulated RF signal supplied from the modulation signal source 33 to control spins in the sample 21. Thus, the demodulator 26 measures the resonant frequency and the resonant frequency shift of the cantilever from the output signal from the cantilever displacement-measuring instrument 29 based on the gradient of the magnetic resonance force. Also, the demodulator 26 measures the shift of the resonant frequency of the cantilever.

The scanner driver power supply 25 controls the scanner 22 such that the DC component Δv of the amount of shift of the resonant frequency of the cantilever is kept constant to adjust the distance Z (described later) from the surface of the sample 21 to the tip of the probe 24, and produces an atomic force microscope (AFM) image of the sample 21. The phase detector 34 produces a magnetic resonance force microscope (MRFM) image according to the AC component δv of the amount of shift of the resonant frequency of the cantilever in the frequency demodulator 26.

For convenience of later reference, the following XYZ-coordinate system is set. The surface (hereinafter may be referred to as the placement surface) of the scanner 22 on which the sample 21 is placed is defined by X- and Y-directions, and the longitudinal direction of the probe 24 of the cantilever 23 that is perpendicular to the placement surface is taken as the Z-axis direction. The position of the tip of the probe 24 taken in the direction in which the tip can move toward and away from the placement surface is indicated by a Z-coordinate, the placement surface being at the origin of the coordinate system. In this case, the distance between the placement surface and the tip of the probe 24 is Z. Similarly, the position of the tip of the probe 24 taken in the plane of the placement surface is indicated by X- and Y-coordinates.

The cantilever self-exciting loop portion includes the cantilever 23, a cantilever displacement-measuring instrument 29 for measuring the displacement of the cantilever 23, a phase shifter 30 for delaying the phase of the output signal (detection signal) from the displacement-measuring instrument 29, a voltage-controlled variable-gain amplifier 28 for amplifying the voltage of the detection signal delayed by the phase shifter 30 at a variable gain, and a cantilever oscillator 27 for oscillating the cantilever 27 based on the output signal from the amplifier 28. Thus, a loop is formed.

The components and the structure are described in the following. With respect to the signal source for modulation, a method illustrated in FIGS. 4A and 4B can also be used in addition to a method illustrated in FIG. 3. The method of FIGS. 4A and 4B will be described supplementarily.

The sample 21 can be a single gene, proteins, or biological molecules, for example. The sample 21 is placed on the scanner 22 that is a sample stage. The scanner 22 is also a three-dimensional actuator for scanning the sample 21 relative to the probe 24 attached to the tip of the cantilever 23 (described later). If relative scanning can be performed, the sample 21 can be scanned while holding the probe 24 or the probe 24 can be scanned while holding the sample 21. The scanner 22 is controlled by the scanner driver power supply 25 that is a control power supply.

The scanner driver power supply 25 receives the demodulated signal from the frequency demodulator 26 (described later). The operation of the scanner 22 is controlled according to the demodulated signal.

The cantilever 23 is a lever for detecting a force. The probe 24 is mounted at the tip of the cantilever. The cantilever 23 converts the interaction produced between the probe 24 and a local portion of the sample 21 into a displacement distance. The cantilever 23 is oscillated by the cantilever oscillator 27. The direction of displacement of the cantilever 23 is the Z-axis direction that is normal to the surface of the scanner 22 on which the sample 21 is placed in FIGS. 5 and 6 (described later).

The cantilever oscillator 27 is an actuator for oscillating the cantilever 23 according to an AC voltage amplified by a voltage-controlled variable-gain amplifier 28 (described later).

The probe 24 is a force-detecting probe capable of detecting both an atomic force microscope (AFM) signal and a magnetic resonance force microscope (MRFM) signal. A specific example of the probe is described now. An AFM probe produces an interaction between the tip of the probe and a local portion of the surface of a sample and detects the interaction. The resolution can be enhanced by sharpening the tip of the probe and reducing the radius of the tip. An MRFM probe produces an inhomogeneous magnetic field in the sample, induces a magnetic interaction with spins present in the resonant magnetic region, and detects the interaction. To achieve these objects, the probe needs to be made of a ferromagnetic material. The resolution can be improved by increasing the gradient of the magnetic field. Hence, the magnet of ferromagnetic material is required to be reduced in size. Accordingly, the probe 24 combining the features of AFM probe and MRFM probe is a ferromagnetic magnet having a tip with a small diameter. In the present embodiment, the direction of magnetization of the ferromagnetic magnet is the Z-axis direction normal to the surface of the scanner 22 on which the sample 21 is placed. The direction of magnetization is not limited to this. For example, the direction of magnetization may be within the XY-plane perpendicular to the Z-axis.

Figure 5:
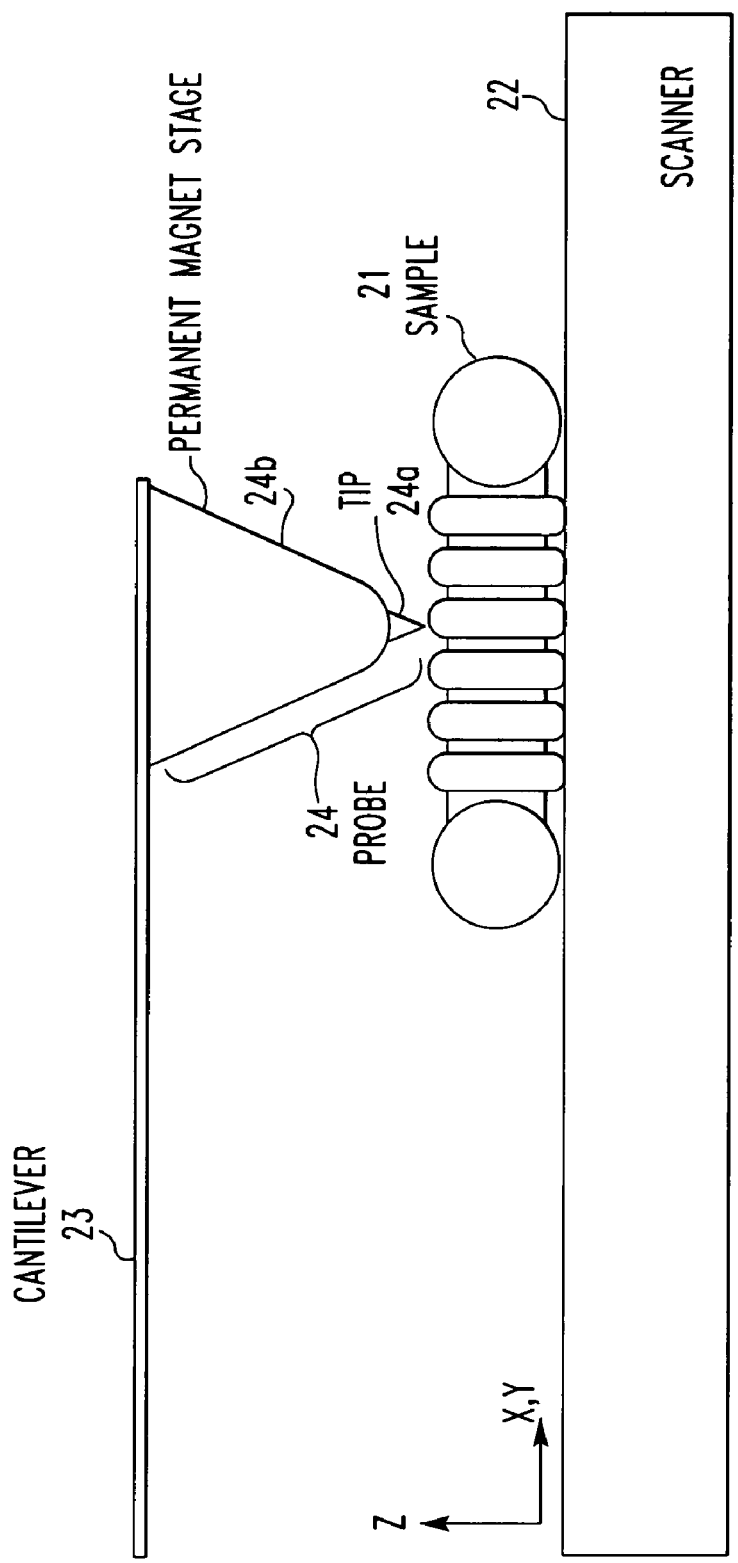
FIG. 5 is a vertical cross section of a specific example of probe attached to the tip of a cantilever, illustrating the manner in which an AFM image is obtained.
Figure 6:
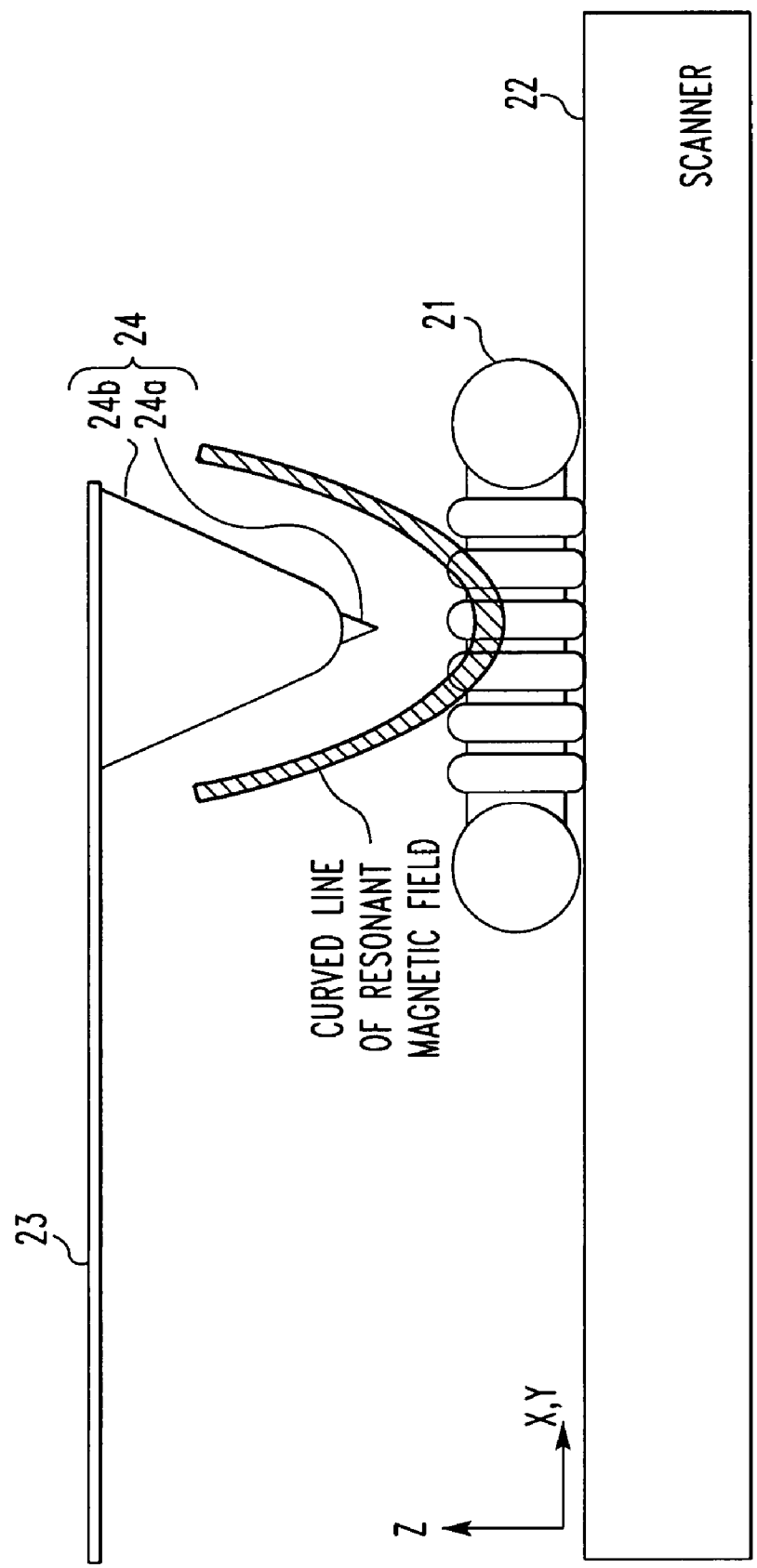
FIG. 6 is a vertical cross section of a specific example of probe attached to the tip of a cantilever, illustrating the manner in which an MRFM image is obtained.

FIGS. 5 and 6 show specific examples of the probe 24 mounted at the tip of the cantilever 23. The probe 24 consists of a tip 24a having a sharp front end and made of a soft magnetic material and a permanent-magnet stage 24b for supplying strong magnetic field to the tip 24a. The tip 24a is strongly magnetized by the permanent-magnet stage 24b. Usable examples of the soft magnetic material forming the tip 24a include (i) iron having good workability and having high saturation magnetic flux density characteristics and high permeability characteristics, (ii) soft ferrites such as Mn—Zn ferrite and Ni—Zn ferrite, (iii) iron-silicon alloy, and (iv) iron-nickel alloy (Permalloy). FIG. 5 shows the manner in which an AFM image is obtained by operating the tip 24a. FIG. 6 shows the manner in which an MRFM image is derived by operating the permanent magnet.

When a strong magnetic field is produced around the probe by an electromagnet, superconducting magnet, or the like, the stage made of permanent magnet may be replaced by a stage made of any of the aforementioned soft magnetic materials. Furthermore, the stage itself may be omitted.

It is assumed that the permanent magnet is made of a ferromagnetic material which has high coercivity and if it is once magnetized by a strong magnetic field, the magnetic flux is semipermanently held without requiring an external magnetic field. It is also assumed that the soft magnetic material is a ferromagnetic material which has a weak coercivity force and does not produce a strong magnetic flux unless a magnetic field is present in the surroundings but which has a high magnetic permeability and is easily magnetized by an external magnetic field. In other words, the soft magnetic material is a ferromagnetic material that does not become a permanent magnet by itself.

Returning to the description of the configuration shown in FIG. 3. The cantilever displacement-measuring instrument 29 detects the displacement distance of the cantilever 23 and converts the distance into an electrical signal. The output signal from the displacement-measuring instrument 29 indicative of the detected displacement is supplied to the frequency demodulator 26 and phase shifter 30 (both of which will be described later).

The RF magnetic field generator 31 produces a uniform RF magnetic field over the whole of the sample 21. The direction of the RF magnetic field is set to be perpendicular to the direction of magnetic field set up in the sample 21 by the probe 24.

The phase shifter 30 can delay the phase of the input signal, which is the output signal from the cantilever displacement-measuring instrument 29 that indicates the detected displacement.

The voltage-controlled variable-gain amplifier 28 is an AC voltage amplifier whose gain can be controlled by an external voltage signal. The amplifier 28 receives the phase-delayed output signal from the displacement-measuring instrument 29 which has been phase-delayed by the phase shifter 30 and is indicative of the detected displacement, and amplifies the AC voltage based on the received signal. The amplified AC voltage is fed to the cantilever oscillator 27.

The frequency demodulator 26 is a device for measuring the frequency shift of the input signal. It is not always necessary to measure the absolute value of the frequency; it suffices to be able to measure the relative value accurately. The input signal is the output signal from the cantilever displacement-measuring instrument 29 indicative of the detected displacement.

The RF signal source 32 is a device for producing an RF signal having a frequency adapted for excitation of magnetic resonance in the sample 21 placed within the magnetic field. The produced RF signal is supplied to the RF magnetic field generator 31. A further requirement is that the signal is amplitude modulated or frequency modulated with an external signal. An AM or FM modulation signal is supplied from the modulation signal source 33 (described later).

The modulation signal source 33 is a signal source for modulating the magnetic resonance. Periodic variation of a magnetic resonance force is made, for example, by modulating RF angular frequency $\omega$, magnetic field $B_0$, or RF magnetic field strength $B_1$ under a magnetic resonance condition given by $\omega = \gamma B_0$ (where $\gamma$ is the gyromagnetic ratio). FIG. 3 shows one example of the modulation signal source 33 for frequency modulating the angular frequency $\omega$ or amplitude modulating the magnetic field strength $B_1$.

With respect to the modulation signal source 33, if only frequency modulation of the angular frequency $\omega$ or only amplitude modulation of the magnetic field strength $B_1$ is performed, there often arises the problem that variations of the force independent of the magnetic resonance force are given to the cantilever, producing large parasitic noise. This problem is taken up in "Anharmonic modulation for noise reduction in magnetic resonance force microscopy", K. J. Bruland, J. Krzystek, J. L. Garbini and J. A. Sidles, *Rev. Sci, Instrument.* Vol. 66 (1995), pp. 2853-2856. Also, a method of addressing the problem is described. When this problem occurs, it is necessary to apply anharmonic modulation consisting of two modulations, e.g., magnetic field modulation (HM) of the magnetic field $B_0$ and amplitude modulation of RF magnetic field strength $B_1$.

FIG. 4B shows one example of anharmonic modulation consisting of two modulations, i.e., magnetic field modulation (HM) and RF modulation. The modulation signal source 33 and modulation signal source 37 are connected with a frequency mixer 36. The output from the frequency mixer 36 is fed to a high-pass filter 35. The filter 35 passes only RF components of the output from the frequency mixer 36 to the RF signal source 32. The RF signal source 32 supplies the generated RF signal to the RF magnetic field generator 31. The modulation signal source 37 supplies the modulation signal also to a magnetic field generator 38. The magnetic field generator 38 performs magnetic field modulation (HM).

FIG. 4A is a diagram illustrating a configuration built when one type of modulation is used as illustrated in connection with FIG. 3, in contrast with the configuration shown in FIG. 4B. A modulation signal is supplied from the modulation signal source 33 to an RF signal source 32, which in turn causes the RF magnetic field generator 31 to produce an RF signal having a frequency adapted to excite magnetic resonance in the sample 21 placed in the magnetic field.

A phase detector 34 is a converter capable of delivering two output DC voltages, i.e., 90°-output A sin ($\phi$-$\phi_{ref}$) and 0°-output A cos ($\phi$-$\phi_{ref}$), in response to two input signals, i.e., an input AC signal A sin ($2\pi\nu t+\phi$) and a reference AC signal $A_{ref}$ sin ($2\pi\nu t+\phi_{ref}$) It is assumed that harmonic components of the outputs such as the frequency $2\nu$ have been filtered out by an appropriate low-pass filter. An MRFM image N (X, Y, Z) is created based on the detection output from the phase detector 34.

Figure 7:
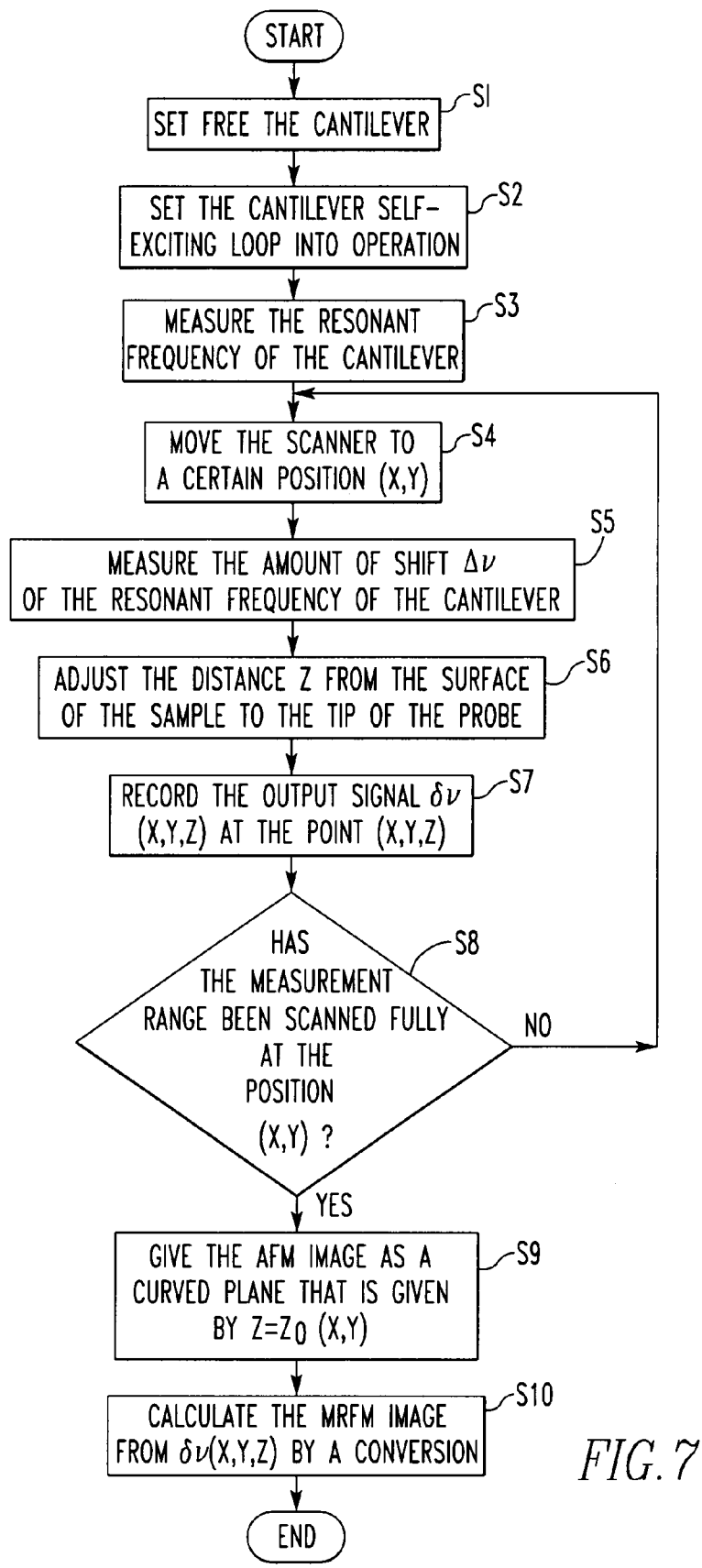
FIG. 7 is a flowchart illustrating the operation of the magnetic resonance force microscope according to Embodiment 1.

The operation of the magnetic resonance force microscope having the configuration shown in as shown in FIG. 3 is next described by referring to the flowchart of FIG. 7. First, in step S1, the scanner 22 is moved to set free the cantilever 23. Under this condition, the probe 24 is sufficiently remote from the scanner 22 and sample 21.

Figure 8:
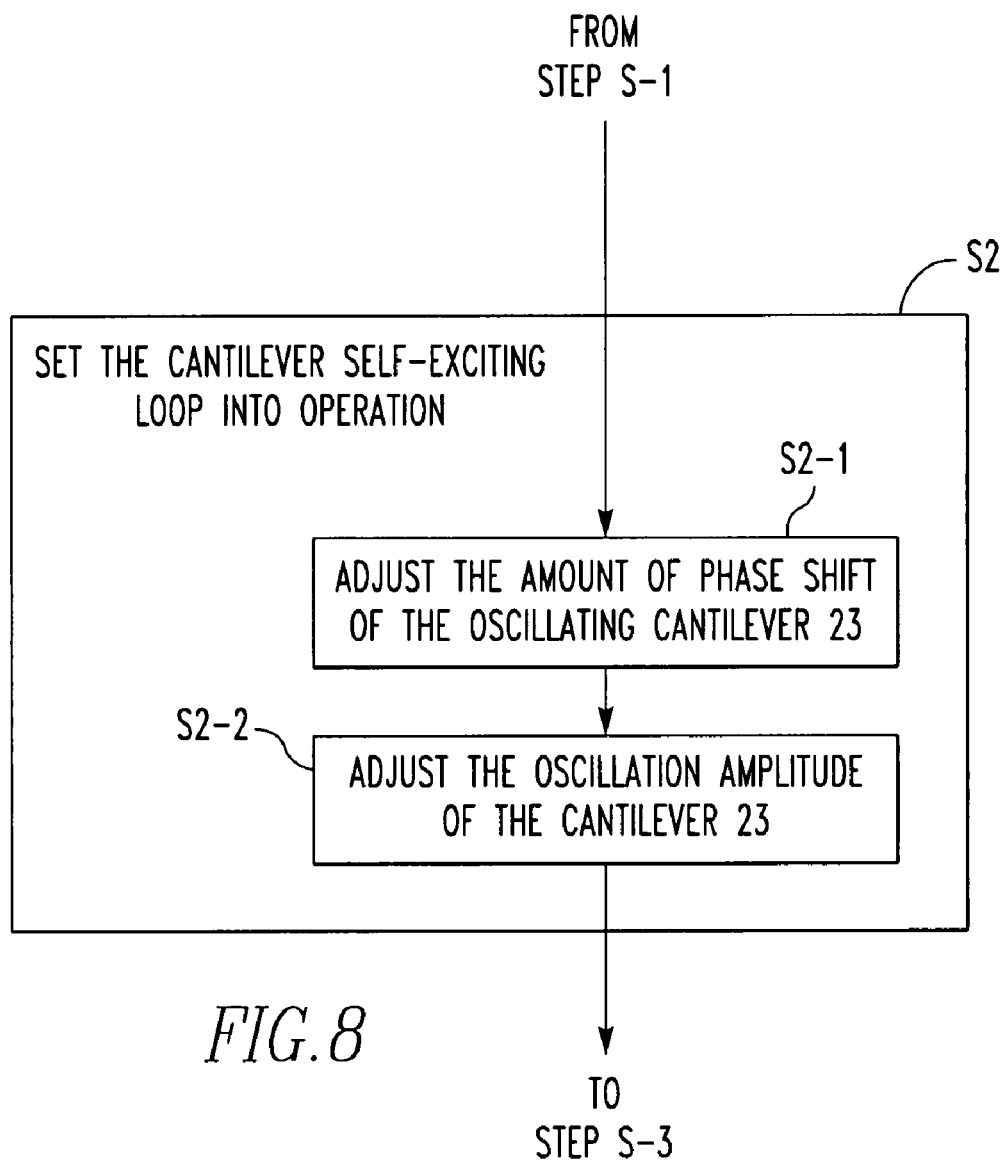
FIG. 8 is a partial enlarged flowchart illustrating the operation of the magnetic resonance force microscope according to Embodiment 1.

In step S2, the cantilever self-exciting loop is set into operation. In particular, as shown in FIG. 8, in step S2-1, the amount of phase shift introduced by the phase shift 30 is so adjusted that the amplitude of the signal of the oscillating cantilever 23 detected by the cantilever displacement-measuring instrument 29 is maximized. The theoretical value of the amount of phase shift is 90°.

In step S2-2, the self-excited amplitude of the cantilever 23 is adjusted by the gain of the voltage-controlled gain-variable amplifier 28, using the signal detected by the cantilever displacement-measuring instrument 29 as a reference. The measurement accuracy of the frequency is improved with increasing the amplitude. However, if the amplitude is increased, the resolution of AFM and MRFM images are deteriorated. Consequently, it is necessary to adjust the amplitude to an appropriate amount according to the target resolution.

In step S3, the resonant frequency of the cantilever 23 that is in a free state is measured. Specifically, the frequency of the AC signal generated stably in step S2 is measured by the frequency demodulator 26.

Figure 9:
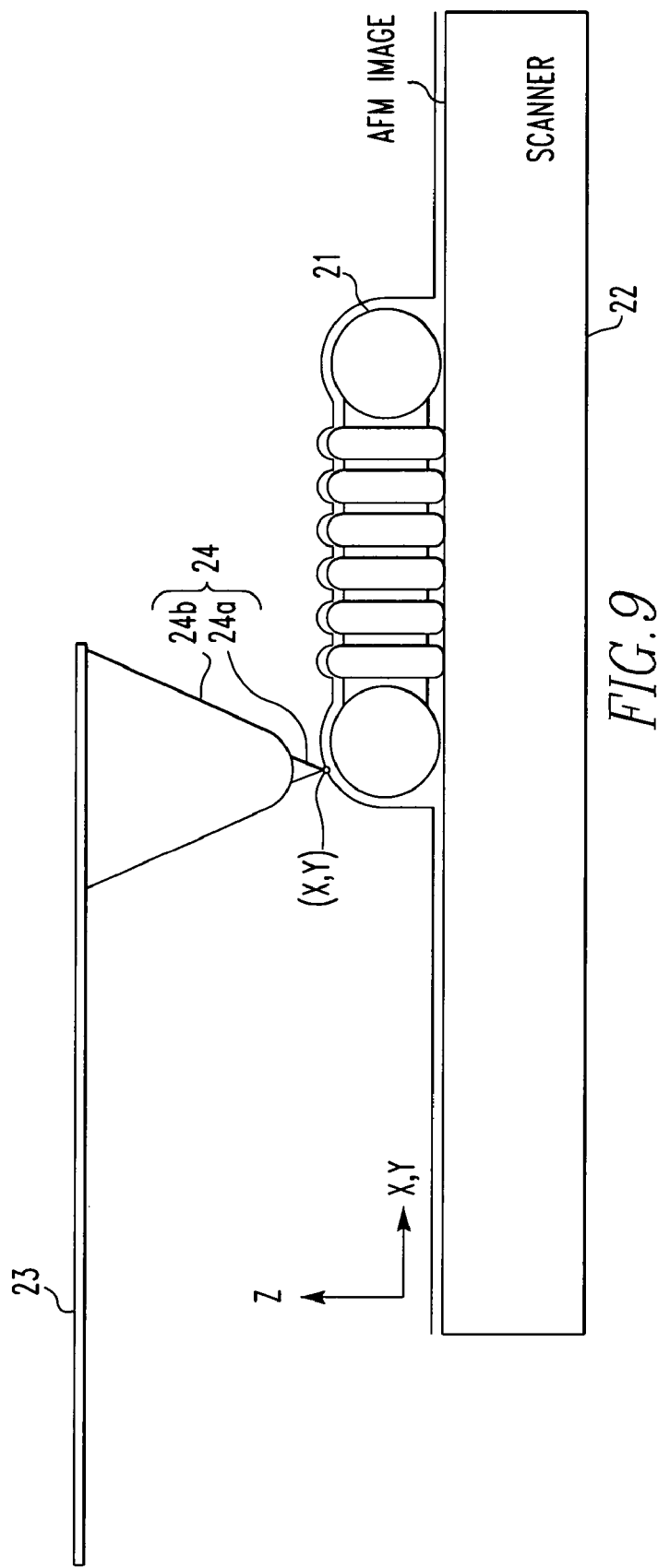
FIG. 9 is a vertical cross section similar to FIG. 6, but illustrating the manner in which the scanner is scanned to a certain position (X, Y)

Then, as shown in FIG. 9, the scanner 22 is moved to a certain position (X, Y) in step S4.

In step 5, an appropriate amount of shift $\Delta\nu$ of the resonant frequency of the cantilever is determined. In step S6, feedback is applied from the frequency demodulator 26 to the scanner driver power supply 25 such that the amount of shift of the frequency monitored by the frequency demodulator 26 agrees with the amount of shift $\Delta\nu$. An adjustment is made while setting the distance Z from the surface of the sample to the tip of the probe to $Z_0$ (X, Y).

Figure 10:
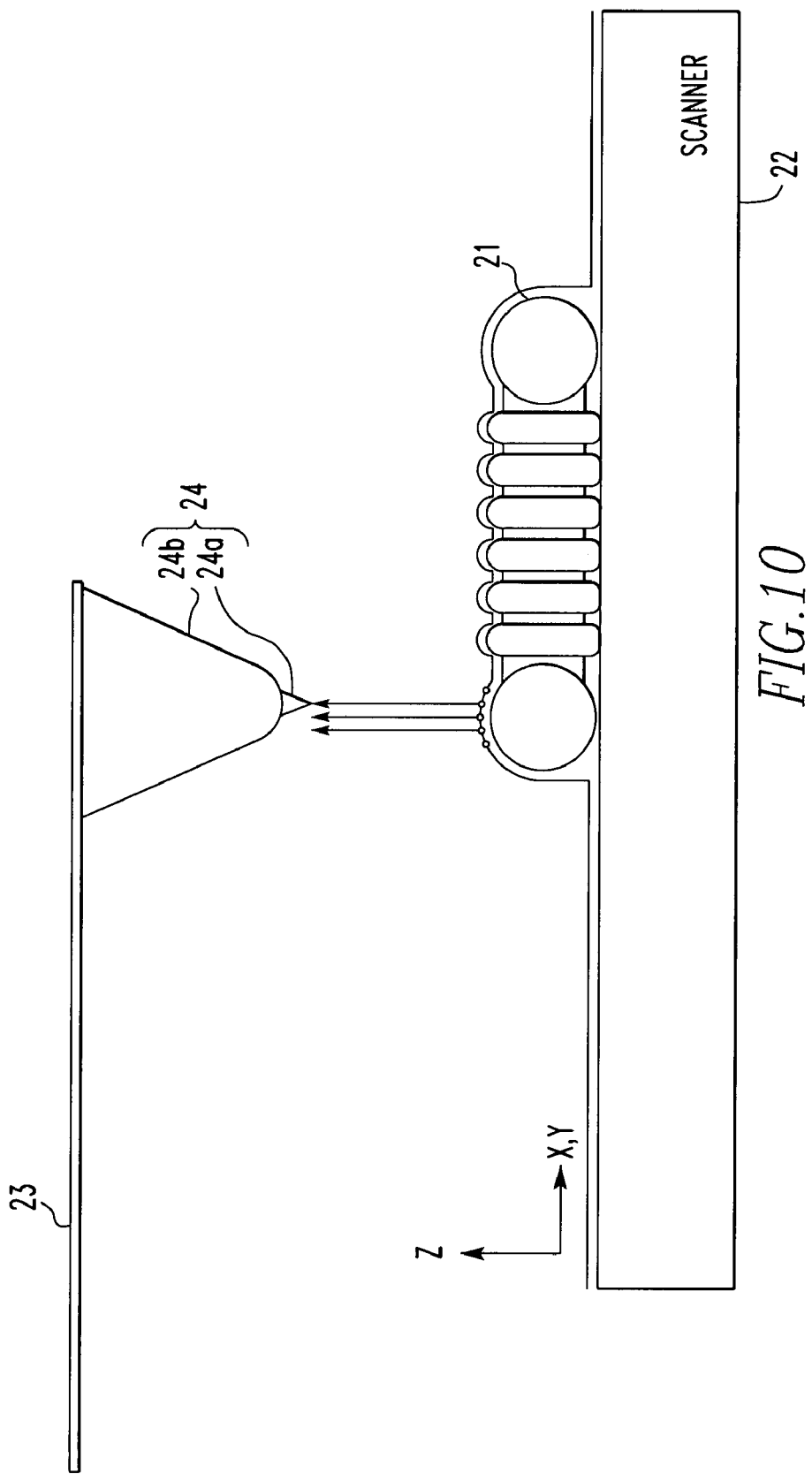
FIG. 10 is a vertical cross section similar to FIGS. 6 and 9, illustrating the manner in which the output signal δv (X, Y, Z) from a phase detector at a point (X, Y, Z) is recorded while making a scan in the Z-direction under the condition in which the position (X, Y) is held fixed.

In step S7, the feedback applied from the frequency demodulator 26 to the scanner driver power supply 25 is stopped. As shown in FIG. 10, the distance Z is scanned while holding the position (X, Y) stationary. Under this condition, the output signal $\delta\nu$ (X, Y, Z) from the phase detector 34 at the point (X, Y, Z) is recorded.

In step S8, a decision is made as to whether the measurement range has been scanned completely over the positions (X, Y) requested. The process steps from the above-described steps S4 to S7 are repeated until the decision becomes affirmative (i.e., the scanning has been completed) to acquire three-dimensional data indicated by the output signal $\delta\nu$ (X, Y, Z). If the amount of shift $\Delta\nu$ is recorded at the same time, a distribution of force gradients can be obtained.

Figure 11:
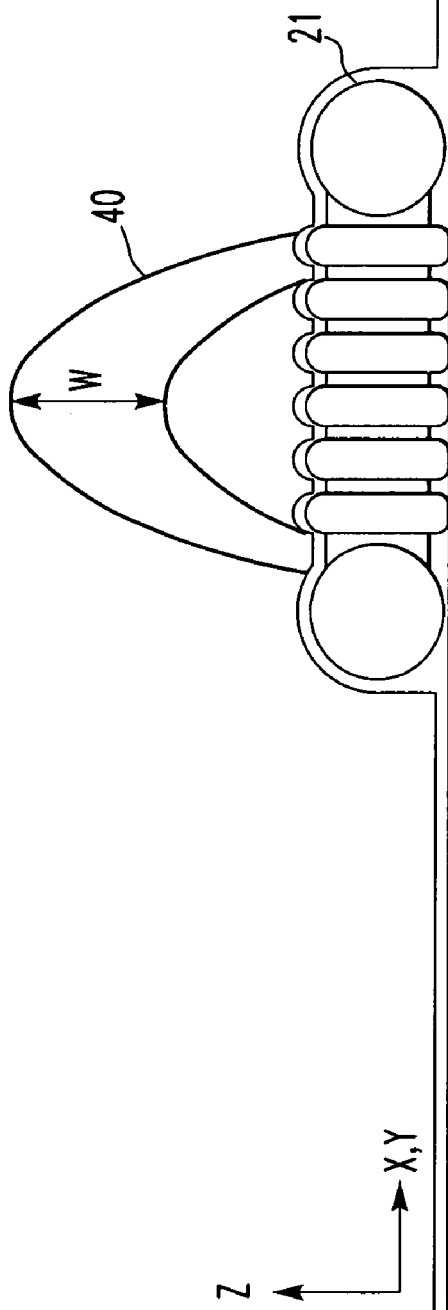
FIG. 11 is a schematic representation of an obtained pattern of δv, showing the distribution of MRFM forces.

FIG. 11 is a schematic view showing the pattern of the obtained output signal $\delta\nu$. The pattern, indicated by 40, assumes a parabolic form and arises from the fact that the curved plane of constant magnetic field strength created by the probe 24 assumes a near-parabolic form. The width W extending in the Z-direction arises from the size of the sample 21 and the magnetic resonance linewidth.

In step S9, the AFM image is given as a curved plane that is given by $Z=Z_0$ (X, Y) as shown in FIG. 9.

In step S10, a conversion is performed from $\delta\nu$ (X, Y, Z) to an MRFM image N (X, Y, Z) according to Eq. (2).

$$\delta\nu(X, Y, Z) = \int\int_v\int dx dy dz P(X-x, Y-y, Z-z) N(x, y, z) \quad (2)$$

Figure 12:
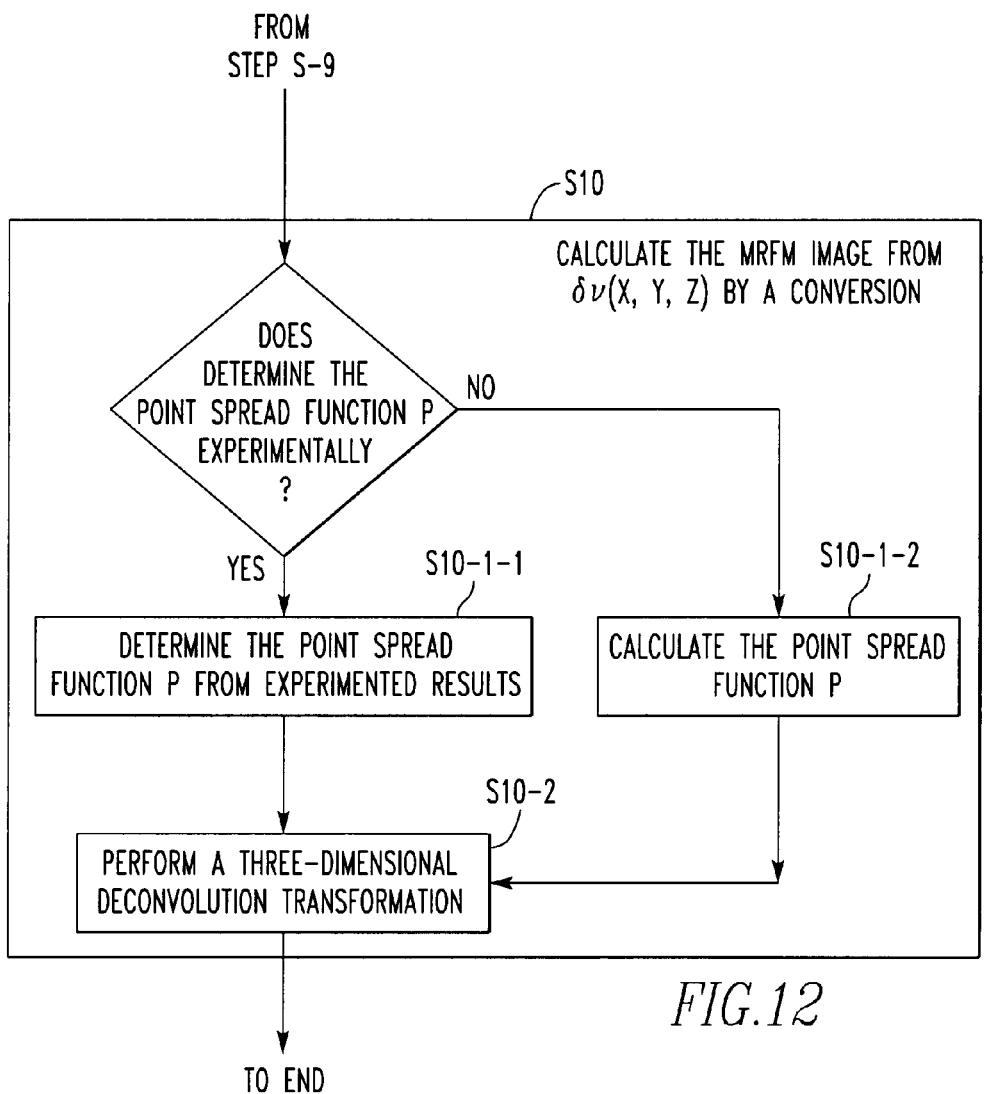
FIG. 12 is a partial enlarged flowchart illustrating the operation of the magnetic resonance force microscope according to Embodiment 1.

The conversion from $\delta\nu$ (X, Y, Z) to N (X, Y, Z) is a three-dimensional deconvolution transform in which the point spread function is P. As shown in FIG. 12, the point spread function is experimentally determined in step S10-1-1 or computationally determined in a work performed in step S10-1-2. The three-dimensional deconvolution transform is described in step S10-2.

In step S10-1-1, the point spread function is found. With respect to a sample (N (x, y, z)=$\delta$ (x, y, z)) (where $\delta$ is a delta function) that can be regarded as a mass point, when the output signal $\delta\nu$ (X, Y, Z) is being measured experimentally, the point spread function is given by P (X, Y, Z)=F (X, Y, Z).

The point spread function can also be found in step S10-1-2. When the distribution $B_z(\vec{r})$ of the magnetic field produced by the probe 24 is known, the point spread function is given by $$P(\vec{r}) = \frac{V_0}{2k}\chi B_z(\vec{r})\left(\frac{\partial^2 H_\alpha(\vec{r'})}{\partial z'\partial\alpha}\right)_{\vec{r'}=\vec{r}} \quad (3)$$

where $\chi$ is the spin magnetic susceptibility that is represented as a function of the magnetic field distribution $B_z(\vec{r})$, RF magnetic field intensity $B_1$, RF angular frequency $\omega$, and relaxation times $T_1$, $T_2$.

In step S10-2, a three-dimensional deconvolution transform is performed. Specific procedures for performing 3D deconvolution transforms include Fourier transform techniques and real-space repetition method and are widely known. For example, the procedures are described in detail in the following literature.

"Magnetic resonance detection and imaging using force microscope techniques," O. Zueger and D. Rugar, J. Appl. Phys. 75 (1994), pp. 6211-6216;

"Numerical Recipes in C book On-Line," W. H. Press, S. A. Teukolsky, W. T. Vetterling and B. P. Flannery, Cambridge University Press, 1988, pp. 538-545; and "Image Processing and Data Analysis," J.-L. Starck and F. Murtagh and A. Bijaoui, Cambridge University Press, 1988.

Figure 13:
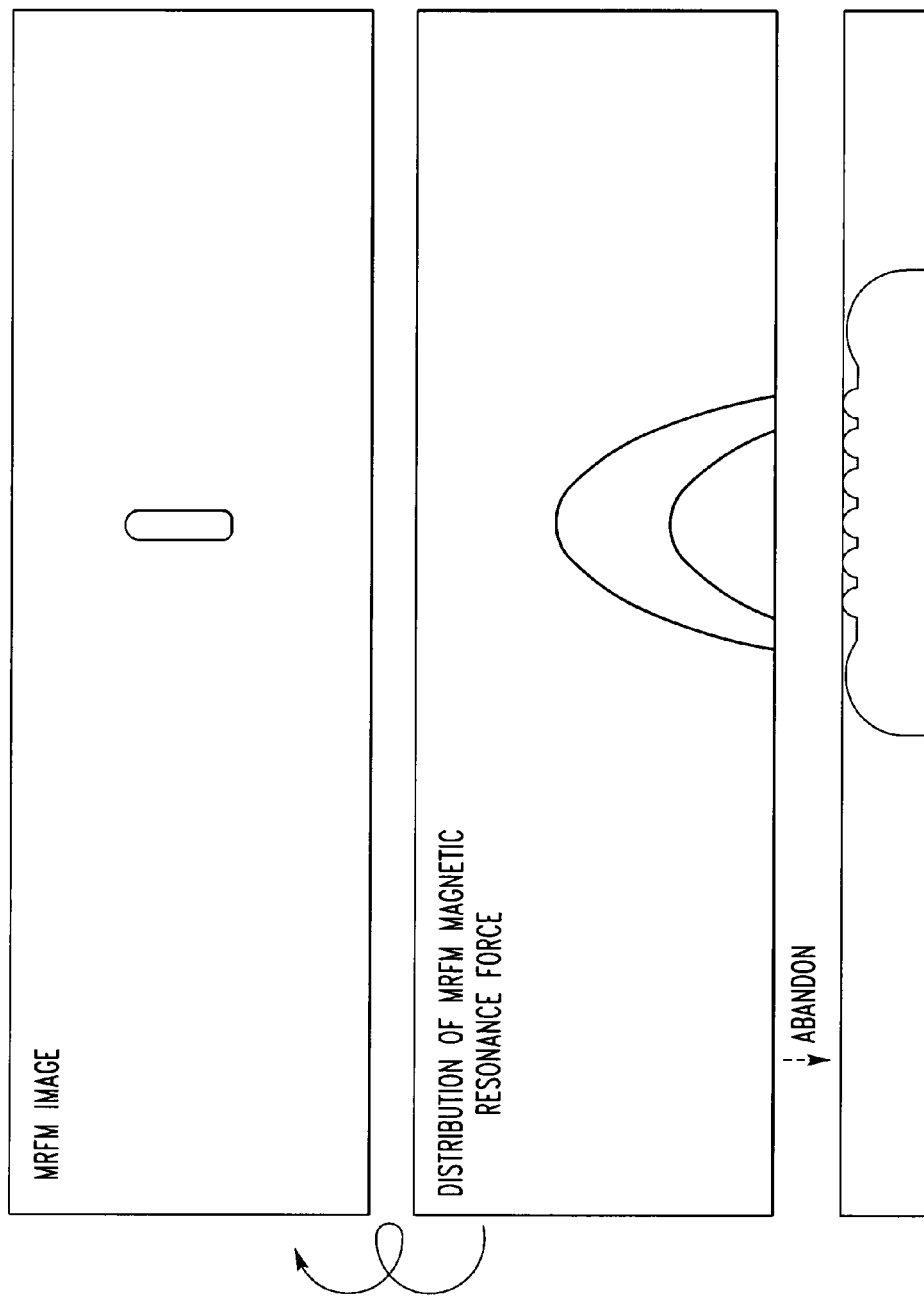
FIG. 13 is a diagram illustrating the manner in which spatial slices where the output signal δv (X, Y, Z) are obtained are irregularly arranged.

However, it is considered that when the spatial slices from which the output signal $\delta\nu$ (X, Y, Z) has been derived are irregularly arranged as shown in FIG. 13, it is difficult to apply a general method of deconvolution transform. In this case, it is necessary that an appropriate required range be selected and processed.

Embodiment 2

Embodiment 2 for obtaining a superimposition of an atomic force microscope (AFM) image and a magnetic resonance force microscope (MRFM) image is next described.

The measured AFM image is a trace of the probe scanned over the surface of the sample while controlling the distance between the probe and the surface of the sample such that the resonant frequency of the cantilever is kept constant. The method of obtaining the image is based on a general, non-contact FM detection method in AFM. The amount of shift $\Delta v$ of the resonant frequency of the cantilever is in proportion to the gradient of the force applied to the cantilever as given by Eq. (1). Therefore, in the image derived by this method, a curved plane on which the gradient of the force produced between the probe and the surface of the sample is constant is drawn.

The measured MRFM image is next described briefly. Spins in the sample are controlled by a magnetic resonance technique, and a magnetic resonance force is produced. If the force gradient is varied periodically, the resonant frequency of the cantilever is modulated with modulation intensity $\delta v$ in accordance with Eq. (1). The MRFM image is obtained by appropriately image-processing a distribution of modulation intensities (distribution of magnetic resonance forces) obtained by scanning the scanner.

The shift of the frequency observed at each point provides a signal whose DC component $\Delta v$ (component not dependent on time) is related to AFM. The AC component $\delta v$ (component varying periodically in time) is related to MRFM. In Embodiment 1, an FM detection method using the cantilever self-excitation loop and frequency demodulator 26 is employed in order to measure a shift of the resonant frequency of the cantilever. In the present Embodiment 2, a method of accurately measuring a frequency shift is used, the method making use of a phase comparison method taking account of mechanical behavior of the cantilever. In Embodiment 1, the amount of shift $\Delta v$ of the frequency and modulation intensity $\delta v$ is measured. In contrast, in Embodiment 2, amount of shift of phase $\Delta \phi$ and phase modulation intensity $\delta \phi$ are measured. For instance, the relationship between $\delta v$ and $\delta \phi$ is given by Eq. (4).

$$\delta \varphi = 2Q \frac{\delta v}{v_0} \quad (4)$$

The components and operation of an apparatus according to Embodiment 2 which is designed to measure shifts of the resonant frequency of the cantilever observed at each point are described below. The apparatus according to Embodiment 2 has many components identical with their counterparts of the apparatus according to Embodiment 1; only different components will be described.

Figure 14:
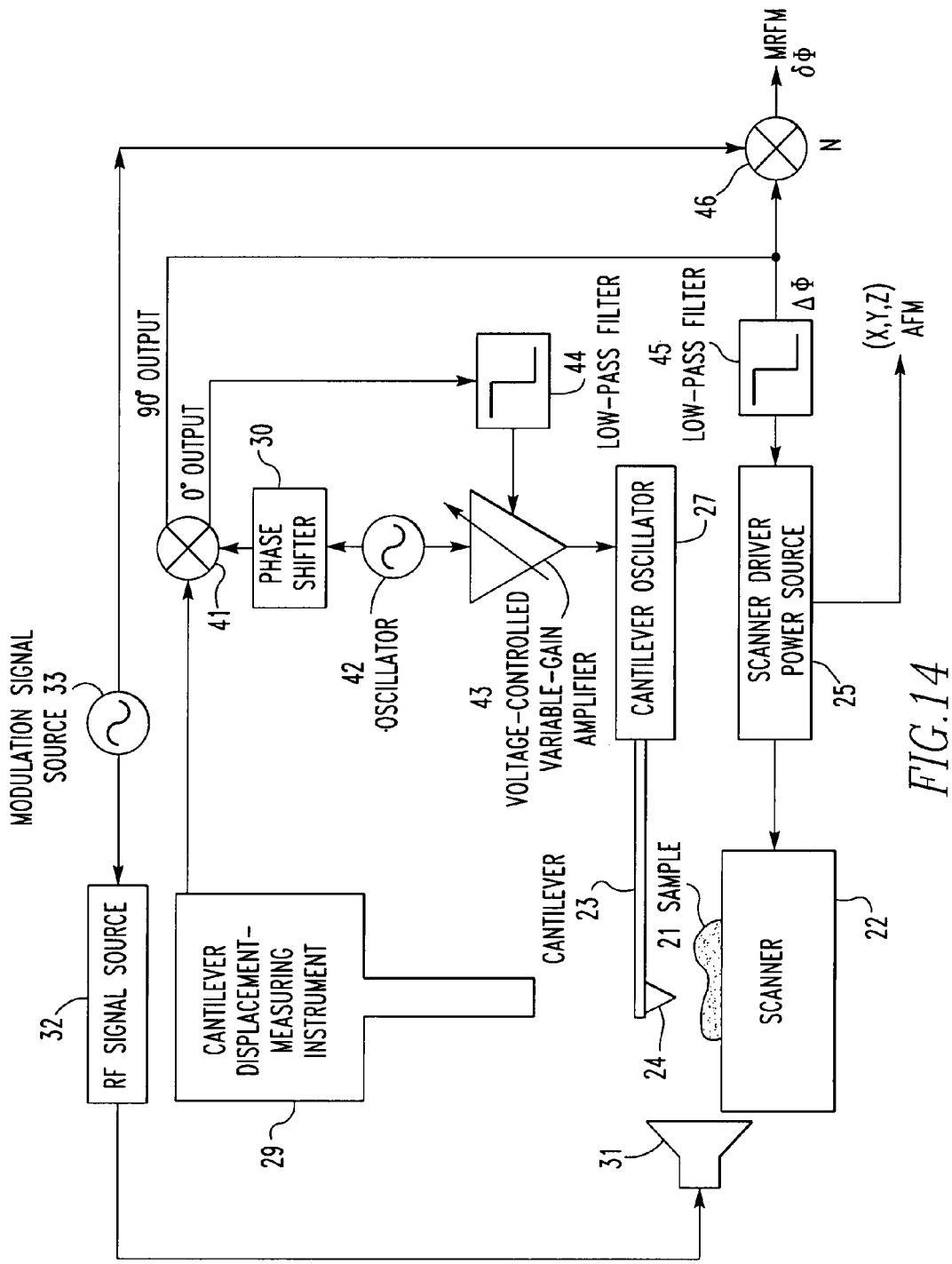
FIG. 14 is a diagram of a magnetic resonance force microscope according to Embodiment 2.

FIG. 14 is a block diagram of a magnetic resonance force microscope according to Embodiment 2. This apparatus has a probe 24 at its tip. Furthermore, the apparatus has a cantilever 23 for detecting the displacement distance produced based on an interaction produced between the probe 24 and a local portion of a sample 21, a scanner 22 for scanning the sample 21 placed on the scanner relative to the probe 24 of the cantilever 23, a cantilever displacement-measuring instrument 29 for converting the displacement distance of the cantilever 23 into an electrical signal, a cantilever excitation portion for exciting the cantilever 23 according to the output signal from the cantilever displacement-measuring instrument 29, an RF magnetic field generator 31 for producing a uniform RF magnetic field over the whole sample 21 that is scanned relative to the probe by the scanner 22, an RF signal source 32 causing the RF magnetic field generator 31 to produce an RF signal having a frequency adapted for excitation of magnetic resonance in the sample 21 present within the magnetic field and to periodically modulate the RF signal, a modulation signal source 33 for supplying the periodically modulated signal to the RF signal source 32, a phase detector 41, a scanner driver power source 25 acting as an atomic force imaging portion, and a magnetic resonance force imaging portion (consisting of a phase detector 46). The phase detector 41 measures the phase shift of the oscillation of the cantilever 23 while the cantilever excitation portion is exciting the cantilever 23 in the RF magnetic field produced uniformly over the whole sample 21 by the RF magnetic field generator 31 in response to the RF signal which is produced and periodically modulated by the RF signal source 32 according to the periodically modulated signal supplied from the modulation signal source 33 to control spins in the sample 21. Thus, the phase detector 41 measures the phase shift of the cantilever from the output signal from the cantilever displacement-measuring instrument 29 based on the magnetic resonance force. The atomic force imaging portion controls the scanner 22 such that the DC component $\Delta \phi$ of the phase shift of the cantilever is kept constant to adjust the distance Z from the surface of the sample 21 to the tip of the probe 24, and produces an atomic force microscope (AFM) image of the sample 21. The magnetic resonance force imaging portion creates an image of magnetic resonance forces according to the intensity $\delta \phi$ of the phase modulation of the cantilever 23.

The cantilever excitation portion has an oscillator 42, a phase shifter 30, a phase detector 41, a low-pass filter 44, a voltage-controlled variable-gain amplifier 43, and a cantilever oscillator 27.

The differences with Embodiment 1 shown in FIG. 3 are that (i) the first phase detector 41 detects the phase of the output signal from the cantilever displacement-measuring instrument 29 indicating the measured displacement, (ii) the 90°-output A sin ($\phi$-$\phi_{ref}$) is fed back to the scanner driver power supply 25 via the low-pass filter 45, and (iii) the same 90°-output A sin ($\phi$-$\phi_{ref}$) is fed to the second phase detector 46. Furthermore, the first phase detector 41 detects the phase of the output signal from the cantilever displacement-measuring instrument 29 indicating the measured displacement and feeds the 0°-output A cos ($\phi$-$\phi_{ref}$) to a voltage-controlled variable-gain amplifier 43 (described later) via the low-pass filter 44.

The low-pass filters 44 and 45 filter out RF components and let DC and low-frequency components pass. The filter 44 filters out the RF component A cos ($4\pi vt + \phi + \phi_{ref}$) of the 0°-output from the phase detector 41 and lets DC and low-frequency components pass to the voltage-controlled variable-gain amplifier 43. The low-pass filter 45 filters out the RF components A sin ($4\pi vt + \phi + \phi_{ref}$) of the 0°-output from the phase detector 41 and lets DC and low-frequency components pass to the scanner driver power supply 25.

The voltage-controlled variable-gain amplifier 43 amplifies the AC voltage with a variable gain based on the DC and low-frequency output component from the low-pass filter 44 from which RF components have been cut out and on the AC signal oscillated by an oscillator 42 (described later), and supplies the amplified AC voltage to the cantilever oscillator 27.

The oscillator 42 is an AC signal generator capable of making semifixed adjustment of the frequency and amplitude of its output signal. One example of the oscillator 42 is a PLL circuit capable of producing any arbitrary frequency. For example, the PLL circuit is made of an accurate reference signal oscillator, frequency divider, frequency multiplier, or phase detector. The oscillator 42 needs to have a function of maintaining the oscillation frequency quite stably after the frequency is adjusted once.

The oscillator 42 supplies the generated AC signal to the voltage-controlled variable-gain amplifier 43 as described previously and also to the phase shifter 30.

The phase shifter 30 is a phase converter capable of delaying the phase of the input signal. The phase shifter delays the phase of the AC signal supplied from the oscillator 42 and feeds the delayed signal to a first phase detector 41. Therefore, the first phase detector 41 detects the phase of the output signal from the cantilever displacement-measuring instrument 29 indicating the measured displacement based on the AC signal from the oscillator 42.

A second phase detector 46 calculates a phase modulation intensity $\delta\phi$ based on the modulation signal from the modulation signal source 33 and on the detection output from the first phase detector 41. The phase modulation intensity $\delta\phi$ is converted into an MRFM image.

Figure 15:
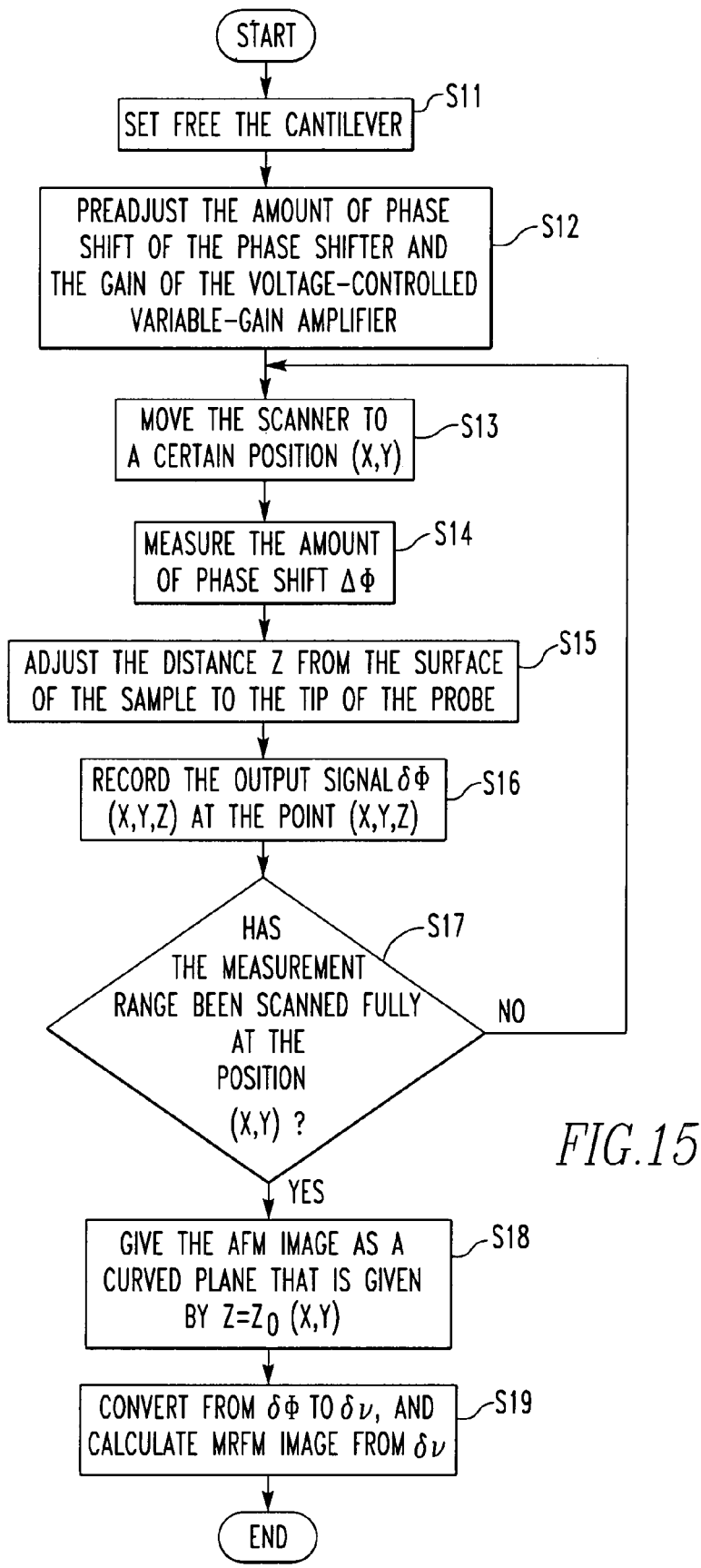
FIG. 15 is a flowchart illustrating the operation of the microscope shown in FIG. 14.

The operation of the magnetic resonance force microscope of the configuration shown in FIG. 14 is next described by referring to the flowchart of FIG. 15. First, in step S11, the scanner 22 is moved to set free the cantilever 23. Under this condition, the probe 24 is sufficiently remote from the scanner 22 and sample 21.

Figure 16:
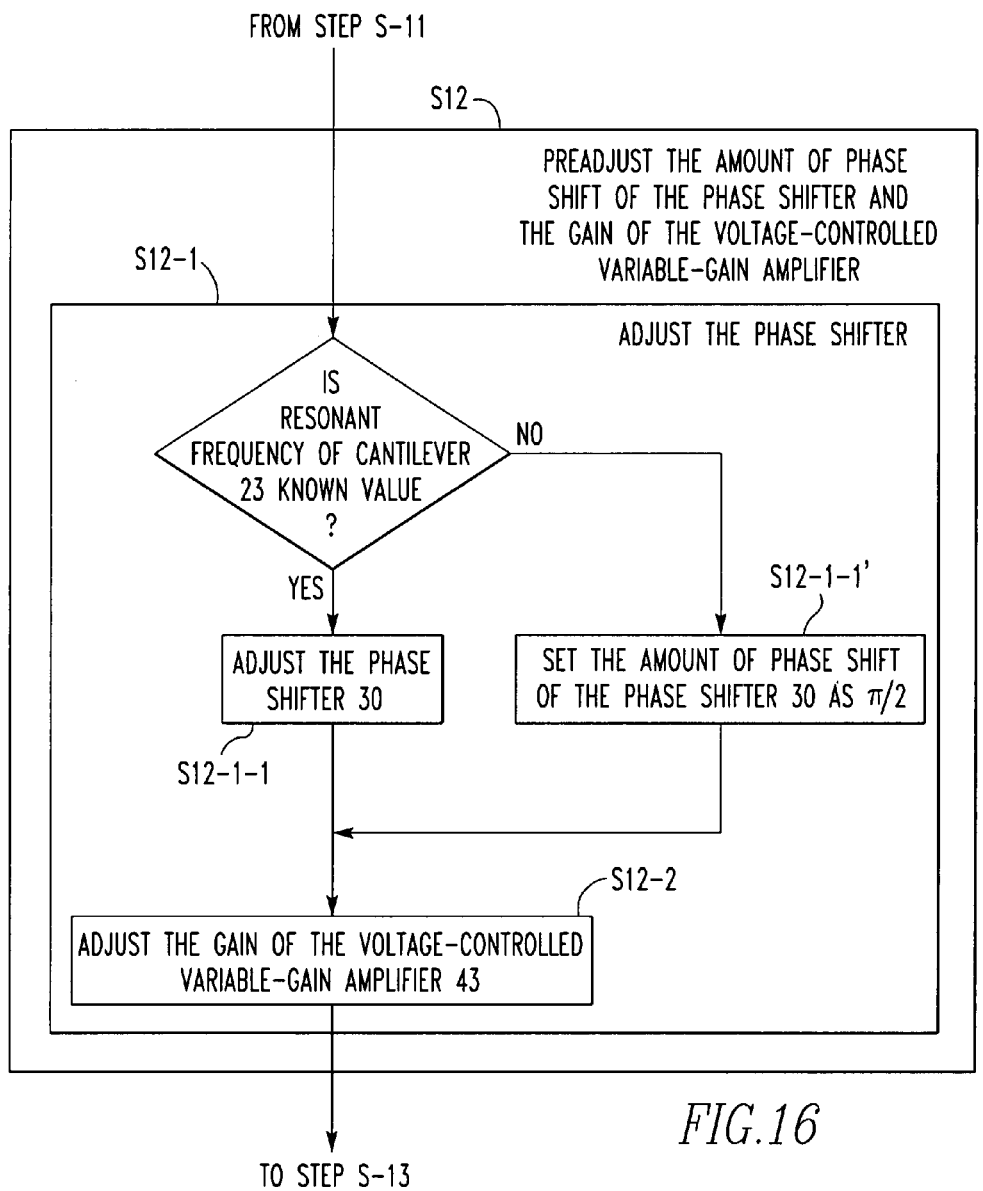
FIG. 16 is a partial enlarged flowchart illustrating the operation of the magnetic resonance force microscope according to Embodiment 2.

In step S12, the amount of phase shift of the phase shifter 30 is preadjusted. As shown in FIG. 16, a method of adjusting the phase shifter 30 is described as step S12-1. If the step S12-1-1 cannot be carried out for some reason, the adjustment can be approximately made by a method described in step S12-1-1'.

In step S12-1-1, the resonant frequency of the cantilever 23 is measured. Known methods for implementing this measurement include measurement of a noise spectrum of the cantilever 23 or ring-down measurement of the cantilever 23. A specific procedure for implementing these methods is described in "Scanning Probe Microscopy, The Lab on a Tip," Ernst Meyer, Hans Josef Hug, Roland Bennewitz, Springer-Verlag (2004), pp. 81-83. The frequency of the oscillator 42 is brought into coincidence with the resonant frequency of the cantilever 23. At this time, the amount of phase shift of the phase shifter 30 is so adjusted that the 90°-output from the phase detector 41 becomes null.

In the method of adjustment in step S12-1-1', an approximate setting is performed as given by $\phi_{ref}=\pi/2$ as described below. The oscillation frequency $\nu$ of the oscillator 42 is so adjusted that the 90°-output from the phase detector 41 becomes null. The frequency $\nu$ adjusted in this way is equal to the resonant frequency of the cantilever 23 in an unloaded condition. This method is correct in a case where the physical length of the route from the oscillator 42 to the phase detector 41 via the voltage-controlled variable-gain amplifier 43 and cantilever displacement-measuring instrument 29 is sufficiently shorter than the wavelength of the AC signal.

In step S12-2, the self-excitation amplitude of the cantilever 23 is adjusted with the gain of the voltage-controlled variable-gain amplifier 43, using the output signal from the cantilever displacement-measuring instrument 29 as a reference. The measurement accuracy of the frequency is improved with increasing the amplitude. However, if the amplitude is increased, the resolution of AFM and MRFM images are deteriorated. Consequently, it is necessary to adjust the amplitude to an appropriate amount according to the target resolution.

In step S13, the scanner 22 is moved to a certain position (X, Y).

Then, in step S14, the phase shift $\Delta\phi$ of the cantilever is measured.

In step S15, the sample 21 is brought close to the probe 24 of the cantilever 23 by the scanner 22 and scanner driver power supply 25, and the distance Z is adjusted to maintain the phase shift $\Delta\phi$ constant. The distance Z obtained at this time is recorded as $Z_0$ (X, Y). A method of adjusting the distance Z is described below from steps S15-1 to S15-2.

Figure 17:
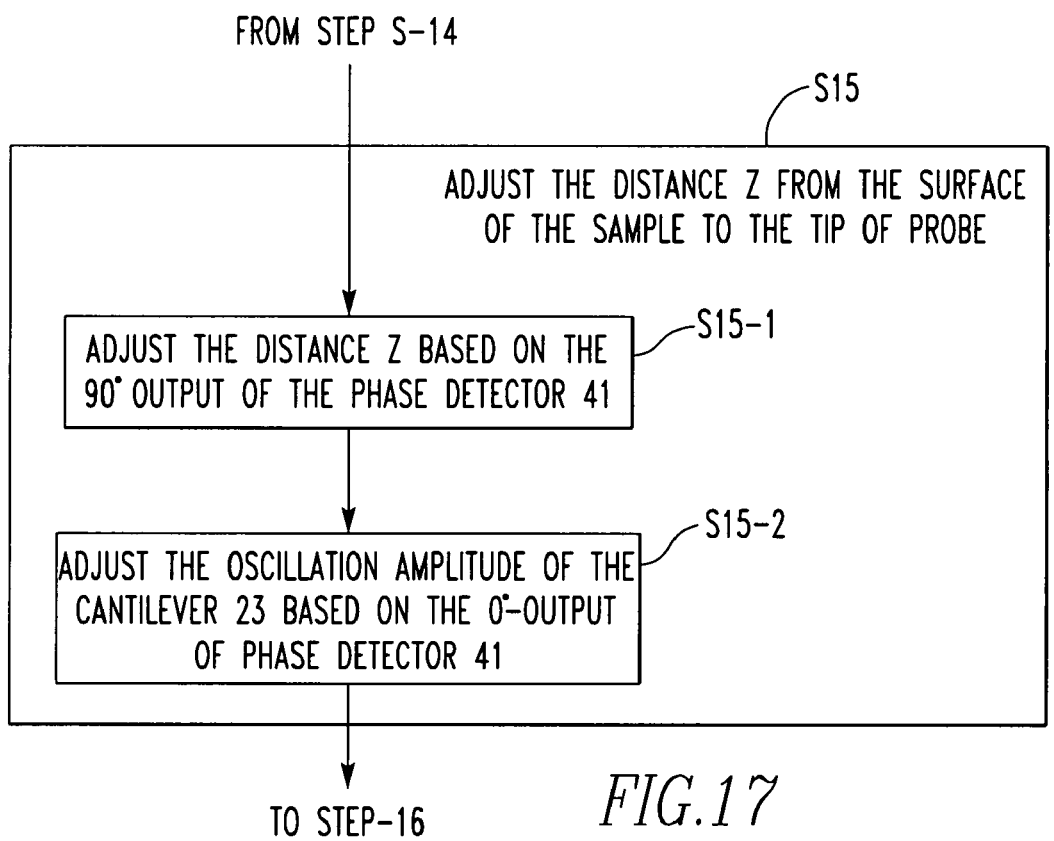
FIG. 17 is a partial enlarged flowchart illustrating the operation of the magnetic resonance force microscope according to Embodiment 2.

As shown in FIG. 17, in step S15-1, the 90°-output is fed back to the scanner power supply 25 such that the 90°-output from the phase detector 41 becomes null. Thus, the distance Z is adjusted.

In step S15-2, the 0°-output is fed back to the voltage-controlled variable-gain amplifier 43 to maintain the 0°-output from the phase detector 41 constant simultaneously with the above-described step S15-1. In this way, the gain of the voltage-controlled variable-gain amplifier 43 is adjusted.

In step S16, the feedback applied from the phase detector 41 to the scanner driver power supply 25 is stopped. The distance Z is scanned while holding the position (X, Y) stationary. Under this condition, the phase modulation intensity $\delta\phi$ at the point (X, Y, Z) is recorded. If $\Delta\phi$ deviates greatly from 0 when the distance Z is scanned, it is necessary to modify the frequency of the oscillator 42 using Eq. (4) as a reference such that $\Delta\phi$ becomes null.

In step S17, a decision is made as to whether the measurement range has been scanned completely over at the position (X, Y) requested. The process steps from the above-described steps S13 to S16 are repeated until the decision becomes affirmative (i.e., the scanning has been completed) to acquire three-dimensional data indicated by the output signal $\delta\phi$ (X, Y, Z). If $\Delta\phi$ is recorded at the same time, a distribution of force gradients can be obtained.

In step S18, the AFM image is given as a curved plane (FIG. 9) that is given by $Z=Z_0$ (X, Y).

In step S19, a conversion is performed from $\delta\phi$ to $\delta\nu$, and an MRFM image is calculated from $\delta\nu$. The processing of step S19 is similar to the processing of step S10 in FIG. 7 referenced in Embodiment 1. However, Eq. (4) is used to perform the conversion from $\delta\phi$ to $\delta\nu$.

Embodiment 3

Embodiment 3 in which a superimposition of an atomic force microscope (AFM) image and a magnetic resonance force microscope (MRFM) image is obtained is next described.

The measured AFM image is a trace of the probe scanned on the surface of the sample, the trace being made while controlling the distance between the probe and the surface of the sample such that the resonant frequency of the cantilever is kept constant. The method of obtaining this image is based on a non-contact FM detection method that is a general method in atomic force microscopy. The amount of shift $\Delta\nu$ of the resonant frequency of the cantilever is in proportion to the gradient of the force applied to the cantilever as given by Eq. (1). Therefore, in the image derived by this method, a curved plane on which the gradient of the force produced between the probe and the surface of the sample is constant is drawn. Furthermore, as given in Eq. (4), a proportional relationship exists between the amount of shift $\Delta\nu$ of the resonant frequency and the amount of phase shift $\Delta\phi$ of oscillation. The trace of the probe at which the amount of phase shift $\Delta\phi$ is kept constant is a curved plane where the force gradient produced between the probe and the surface of the sample is kept constant, in the same way as the trace at which the amount of shift Δv is kept constant.

The measured MRFM image is next described briefly. Spins in the sample are controlled by a magnetic resonance technique, and a magnetic resonance force is produced. If the force is varied periodically at the resonant frequency of the cantilever, the phase of the oscillation of the cantilever shifts (δϕ). The MRFM image is obtained by appropriately image-processing a distribution of δϕ (distribution of magnetic resonance forces) obtained by scanning the scanner.

A phase shift Δϕ (component not dependent on time) observed at each point provides a signal related to AFM. A phase modulation intensity δϕ of signal (component varying periodically in time) is related to MRFM. The components and operation of an apparatus used to measure the waveform of a signal indicating the oscillation of the cantilever which is observed at each point are described below. The apparatus according to Embodiment 3 has many components identical with their counterparts of the apparatus according to Embodiment 2; only different components will be described.

Figure 18:
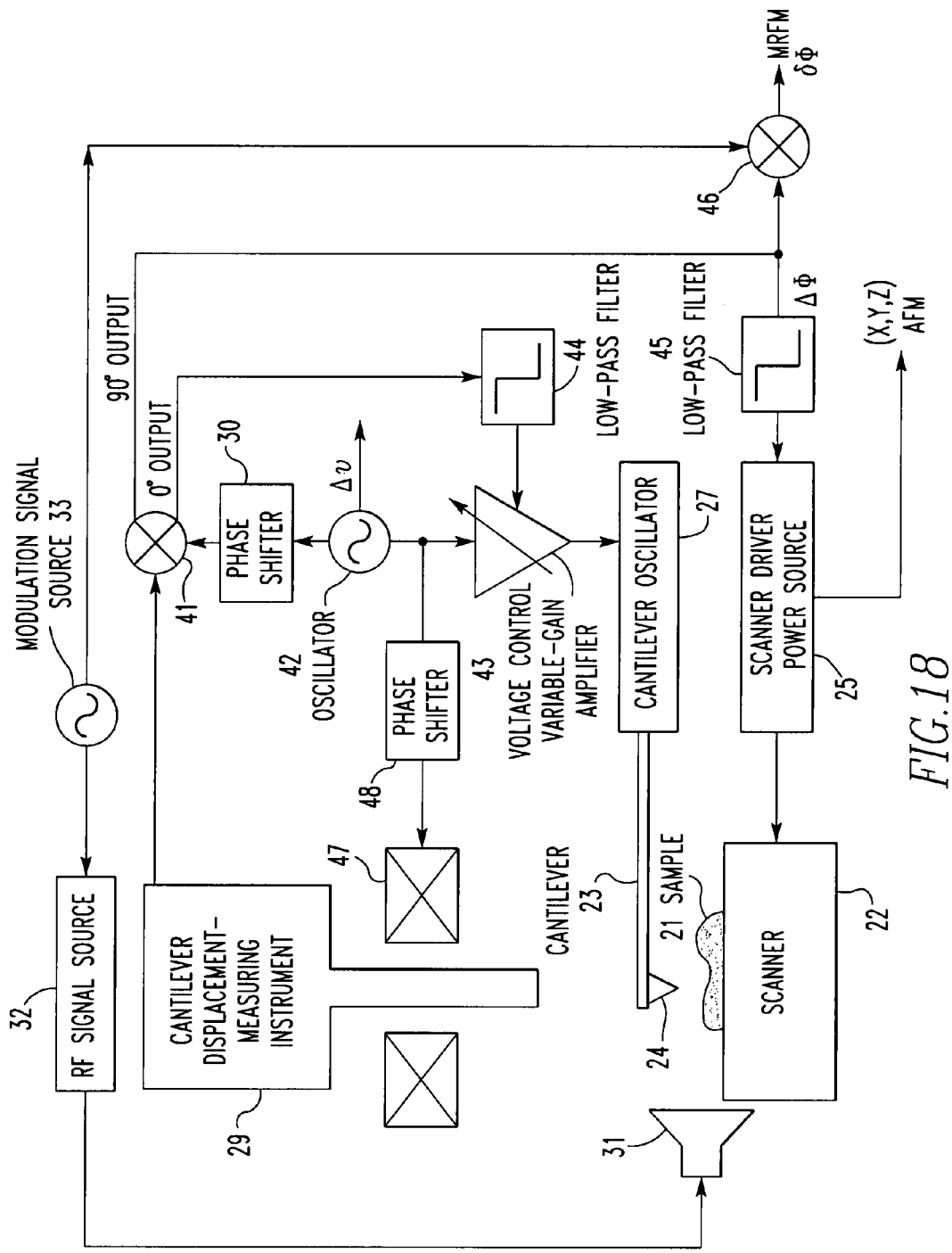
FIG. 18 is a diagram of a magnetic resonance force microscope according to Embodiment 3.

FIG. 18 is a block diagram of a magnetic resonance force microscope according to Embodiment 3. This apparatus has a probe 24 at its tip. Furthermore, the apparatus has a cantilever 23 for detecting the displacement distance produced based on an interaction produced between the probe 24 and a local portion of a sample 21, a scanner 22 for scanning the sample 21 placed on the scanner relative to the probe 24 of the scanner 23, a cantilever displacement-measuring instrument 29 for converting the displacement distance of the cantilever 23 into an electrical signal, a cantilever excitation portion for exciting the cantilever 23 according to the output signal from the cantilever displacement-measuring instrument 29, an RF magnetic field generator 31 for producing a uniform RF magnetic field over the whole sample 21 that is scanned relative to the probe by the scanner 22, an RF signal source 32 causing the RF magnetic field generator 31 to produce an RF signal having a frequency adapted for excitation of magnetic resonance in the sample within the magnetic field and to periodically modulate the RF signal, a modulation signal source 33 for supplying the periodically modulated signal to the RF signal source 32, a phase detector 41, an atomic force imaging portion (consisting of a scanner driver power source 25), and a magnetic resonance force imaging portion (consisting of a phase detector 46). The phase detector 41 measures the phase shift of the oscillation of the cantilever 23 while the cantilever excitation portion is exciting the cantilever 23 in the RF magnetic field produced uniformly over the whole sample 21 by the RF magnetic field generator 31 in response to the RF signal which is produced and periodically modulated by the RF signal source 32 according to the periodically modulated signal supplied from the modulation signal source 33 to control spins in the sample 21. Thus, the magnetic resonance force is produced. The phase detector 41 measures the phase shift of the oscillation of the cantilever 23 from the output signal from the cantilever displacement-measuring instrument 29 based on the magnetic resonance force. The atomic force imaging portion controls the scanner 22 such that the DC component Δϕ of the phase shift of the cantilever 23 is kept constant to adjust the distance Z from the surface of the sample 21 to the tip of the probe 24, and produces an atomic force microscope (AFM) image of the sample 21. The magnetic resonance force imaging portion produces a magnetic resonance force microscope (MRFM) image according to the phase modulation intensity δϕ of the cantilever 23.

The cantilever excitation portion has an oscillator 42, a phase shifter 30, a phase detector 41, a low-pass filter 44, and a voltage-controlled variable-gain amplifier 43.

The signal from the oscillator 42 is delayed by the phase shifter 48. The signal is also sent to the route connected to the modulation signal source 47.

The phase shifter 48 is a phase converter capable of delaying the phase of an AC signal that is an input signal. It is required that the amount of the phase shift can be set stably without changing with time. The phase shifter 48 delays the phase of the AC signal whose frequency is adjusted according to an external signal in the oscillator 42, and supplies the delayed phase to other modulation signal source 47.

The modulation signal source 33 is a signal source for modulating magnetic resonance. Periodic variation of a magnetic resonance force is made, for example, by modulating RF angular frequency ω, magnetic field $B_0$, or RF magnetic field strength $B_1$ under a magnetic resonance condition given by ω=γ $B_0$ (where γ is the gyromagnetic ratio). FIG. 18 shows one example of a modulation signal source for frequency modulating the angular frequency ω or amplitude modulating the magnetic field strength $B_1$.

The other modulation signal source 47 is also a signal source for modulating magnetic resonance, and is a modulation source different from the modulation signal source 33. Periodic variation of a magnetic resonance force is made, for example, by modulating RF angular frequency ω, magnetic field $B_0$, or RF magnetic field strength $B_1$ under a magnetic resonance condition given by ω=γ $B_0$ (where γ is the gyromagnetic ratio). FIG. 18 shows one example of a modulating magnetic field generator for modulating the magnetic field set up by the probe 24.

A magnetic resonance force $F_s$ sin ωt can be produced relying on these two modulation signal sources. A circumstance in which the amplitude $F_s$ can be varied periodically in time can be realized. FIG. 18 shows an example in which the magnetic resonance force $F_s$ sin ωt is given by the modulation signal source 47 and the amplitude $F_s$ is periodically varied by the modulation signal source 33. In another available example, the magnetic resonance force $F_s$ sin ωt is given by the modulation signal source 33 and the amplitude $F_s$ is periodically varied in time by the modulation signal source 47. In a further example, if a function of modulating intensity is imparted to the modulation signal source 33, the magnetic resonance force $F_s$ sin at is given by the modulation signal source 33 and the amplitude $F_s$ is varied periodically in time by the intensity-modulating function of the modulation signal source 33. In this example, the modulation signal source 47 is not necessary. In yet another example, if a function of modulating intensity is imparted to the modulation signal source 47, the magnetic resonance force $F_s$ sin ωt is given by the modulation signal source 47 and the amplitude $F_s$ is varied periodically in time by the intensity-modulating function of the modulation signal source 47. In this example, the modulation signal source 33 is not necessary.

The great difference with the embodiment shown in FIG. 14 is that a modulation signal source for producing a magnetic resonance force $F_s$ sin ωt (where the amplitude $F_s$ varies periodically) to achieve intensity modulation is equipped. Another feature is that there is a phase shifter provided for adjusting the intensity-modulated varying phase. In the embodiment shown in FIG. 14, satisfactory results were obtained when there was a modulation signal source for producing a steady gradient (dF/dα sin ωt; where dF/dα is constant) in the magnetic resonance force.

The magnetic resonance force microscope of this Embodiment 3 is different in principle of operation from Embodiments 1 and 2. The principle of operation is first described. Assuming that an urging force applied to the cantilever 23 by the cantilever oscillator 27 is $F_e \cos \omega t$, a circumstance in which the cantilever 23 is oscillating is now discussed.

Furthermore, a magnetic resonance force is produced as a second urging force $F_s \sin \omega t$ that has the same frequency but is different in phase by 90°. It is assumed that the amplitude $F_s$ can be varied periodically in time.

Motion of the cantilever 23 is described by an equation of motion given by Eq. (5).

$$\ddot{z} + \frac{2\pi v_0}{Q} \dot{z} + (2\pi v_0)^2 z = \frac{F_s}{m} \sin \omega t + \frac{F_e}{m} \cos \omega t \quad (5)$$

where $v_0$ is the resonant frequency of the cantilever and given by the following Eq. (6).

$$v_0 = \frac{1}{2\pi\sqrt{m}} \sqrt{k - \frac{\partial F_\alpha}{\partial \alpha}} \quad (6)$$

In Eq. (5), Q is the Q value of the cantilever, m is the effective mass of the cantilever, and k is the spring constant of the cantilever in an unloaded condition. Solving the equation of motion of Eq. (5) for time results in a solution given by Eq. (7). $z_0$ and $\phi$ contained in the solution of Eq. (7) are described by Eqs. (8) and (9), respectively.

$$z(t) = z_0 \cos(2\pi v t + \phi) \quad (7)$$

$$z_0 = \frac{\sqrt{F_s^2 + F_e^2 v_0^2}}{k\sqrt{(v^2 - v_0^2)^2 + \frac{v_0^2 v^2}{Q^2}}} \quad (8)$$

$$\phi = \tan^{-1}\left(\frac{F_s v v_0 + F_e(v_0^2 - v^2)Q}{F_e v v_0 + F_s(v_0^2 - v^2)Q}\right) \quad (9)$$

Phase detecting the signal z (t) obtained in the solution of Eq. (7) with the reference signal cos (2πvt) by the phase detector 41 gives rise to 0°-output $z_0 \cos \phi$ and 90°-output $z_0 \sin \phi$. An adjustment is made such that the time-averaged value of the 90°-output is kept at 0 at all times. The time-averaging operations are performed at intervals of time sufficiently larger than the reciprocal of the oscillation frequency of the modulation signal source 33. The adjustment is made by adjusting the oscillation frequency v of the oscillator 42. Alternatively, the adjustment may be made by adjusting the force applied to the cantilever, which is carried out by manipulating the scanner 22 in accordance with Eq. (1). At this time, the frequency v of the oscillator 42 is equal to $v_0$. Therefore, the 0°-output is equal to $z_0$. The amplitude $z_0$ is given by Eq. (10).

$$z_0 = \frac{Q}{k} \sqrt{F_s^2 + F_e^2} \quad (10)$$

The difference $\phi$ between the phase of the phase shifter 42 and the amplitude phase of the cantilever 23 is given by Eq. (11).

$$\phi = \tan^{-1}\left(\frac{F_s}{F_e}\right) \quad (11)$$

An AFM signal is contained in the frequency v of the signal z (t) given by Eq. (7), the frequency being given by the following Eq. (12). An MRFM signal ($F_s$) is contained in the phase difference $\phi$ given by Eq. (11). As described previously, the amplitude $F_s$ can be varied periodically in time by the modulation signal source 33. Consequently, it can be said that the DC component of the 90°-output from the phase detector 41 is the AFM output and the AC component is the MRFM signal.

$$v = v_0 = \frac{1}{2\pi\sqrt{m}} \sqrt{k - \frac{\partial F_\alpha}{\partial \alpha}} \quad (12)$$

Figure 19:
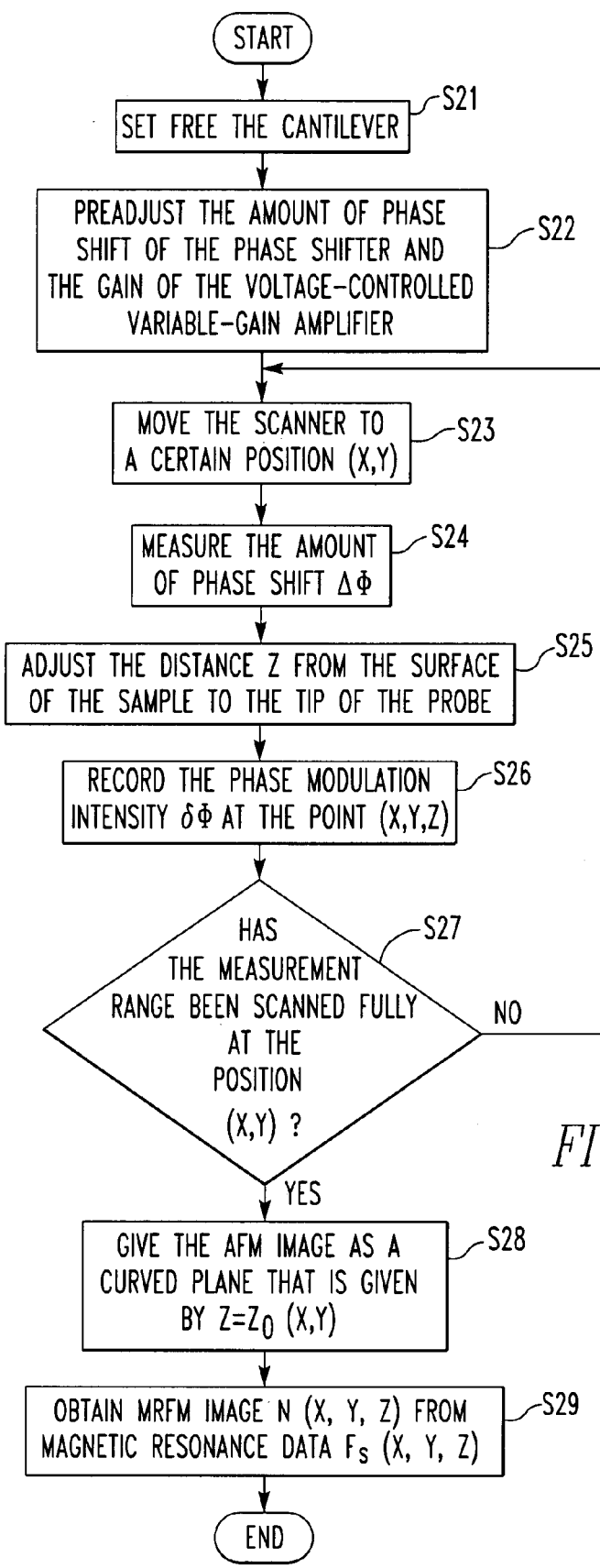
FIG. 19 is a flowchart illustrating the operation of the microscope shown in FIG. 18.

An operation for obtaining a superimposition of images in practice using the components shown in FIG. 18 based on the principle of operation described previously is next described. FIG. 19 is a flowchart illustrating a procedure of processing for obtaining the superimposition of images.

First, in step S21, the scanner 22 is moved to set free the cantilever. Under this condition, the probe 24 is sufficiently remote from the scanner 22 and sample 21. Any interaction (such as atomic force or magnetic resonance force) is not exerted at all between the probe 24 and sample 21.

Figure 20:
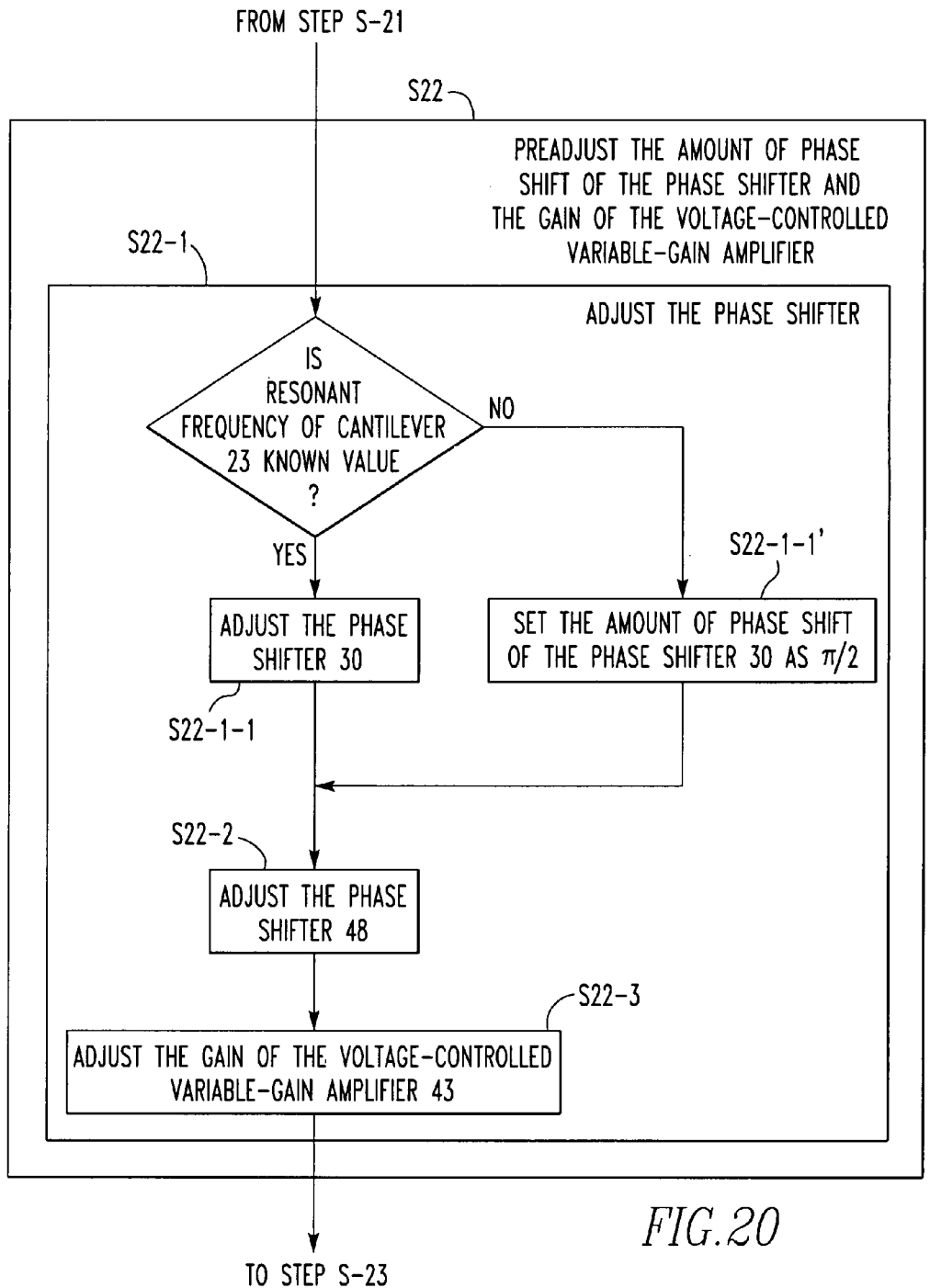
FIG. 20 is a partial enlarged flowchart illustrating the operation of the magnetic resonance force microscope according to Embodiment 3.

In step S22, the amount of phase shift of the phase shifter 30 and the gain of the voltage-controlled variable-gain amplifier 43 are previously adjusted. As shown in FIG. 20, a method of adjusting the amount of phase shift of the phase shifter 30 is described in step S22-1. Where step S22-1-1 is not performed for some reason, the adjustment can be approximately made also by a method described in step S22-1-1'.

In step S22-1-1, the resonant frequency of the cantilever is measured. Known methods for implementing this measurement include measurement of a noise spectrum of the cantilever or ring-down measurement of the cantilever. A specific procedure for implementing these methods is described in "Scanning Probe Microscopy, The Lab on a Tip," Ernst Meyer, Hans Josef Hug, Roland Bennewitz, Springer-Verlag (2004), pp. 81-83. The frequency of the oscillator 42 is brought into coincidence with the resonant frequency of the cantilever 23. At this time, the amount of phase shift of the phase shifter 30 is so adjusted that the 90°-output from the phase detector 41 becomes null.

In the method of adjustment in step S22-1-1', an approximate setting is performed as given by $\phi_{ref} = \pi/2$ as described below. The oscillation frequency v of the oscillator 42 is so adjusted that the 90°-output from the phase detector 41 becomes null. The frequency v adjusted in this way is equal to the resonant frequency of the cantilever 23 in an unloaded condition. This method is correct in a case where the physical length of the route from the oscillator 42 to the phase detector 41 via the voltage-controlled variable-gain amplifier 43 and cantilever displacement-measuring instrument 29 is sufficiently shorter than the wavelength of the AC signal.

In step S22-2, the phase shifter 48 is adjusted such that the phase of oscillation of modulation is shifted 90° relative to the phase of oscillation of the cantilever. A theoretical optimum value of the amount of phase shift is 90°. However, where the modulation signal is passed through a high power amplifier, there is a possibility that the phase is delayed. Therefore, it is necessary to make an appropriate correction.

In step S22-3, adjustment of the amplitude at which the cantilever is excited is described. The self-excitation amplitude of the cantilever is adjusted with the gain of the voltage-controlled variable-gain amplifier 43, using the output signal from the cantilever displacement-measuring instrument 29 as a reference. The measurement accuracy of the frequency is in proportion to the amplitude. However, if the amplitude is large, the resolutions of AFM and MRFM images are low. Consequently, it is necessary to adjust the amplitude to an appropriate amount according to the target resolution.

In step S23, the scanner 22 is moved to a certain position (X, Y).

Next, in step S24, the phase shift $\Delta\phi$ of the cantilever is measured.

In step S25, the sample 21 is brought close to the probe 24 of the cantilever 23 by the scanner 22 and scanner driver power supply 25. The distance Z is adjusted such that the phase shift $\Delta\phi$ is kept constant. The distance Z obtained at this time is recorded as $Z_0$ (X, Y). A method of adjusting the distance Z is described below as steps S25-1 to S25-2.

In step S25-1, the 90°-output is fed back to the scanner driver power supply 25 such that the 90°-output from the phase detector 41 becomes null. Thus, the distance Z is adjusted.

Figure 21:
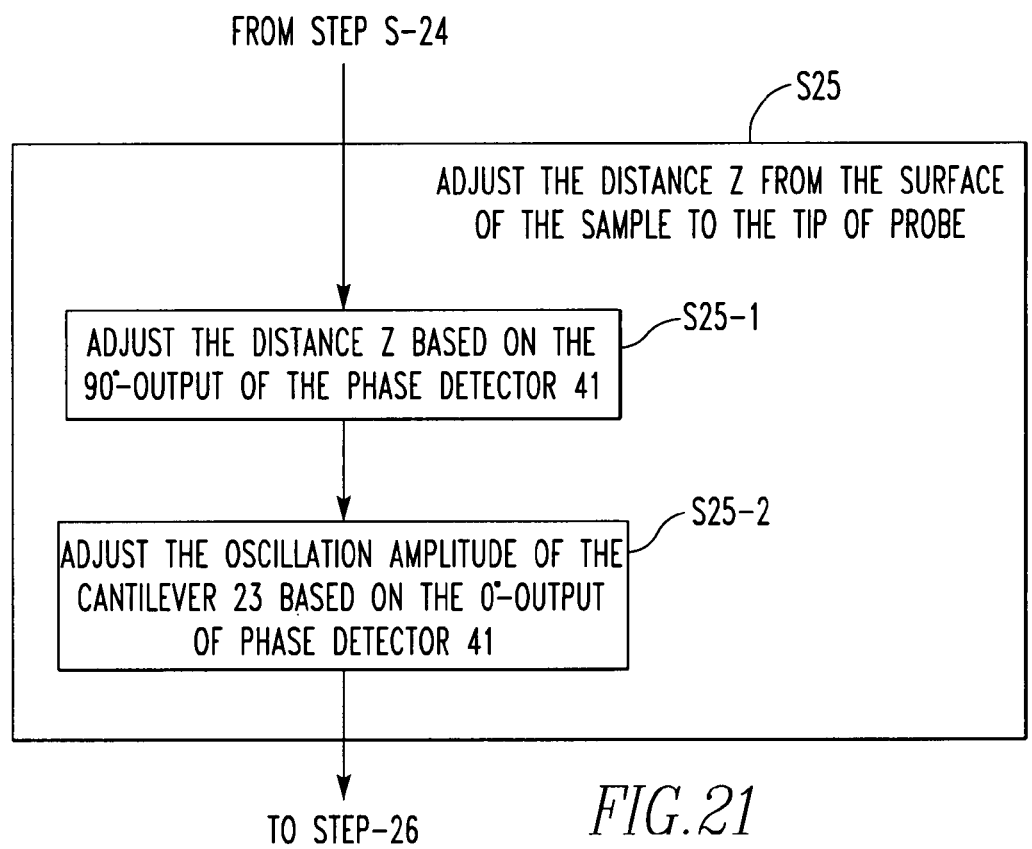
FIG. 21 is a partial enlarged flowchart illustrating the operation of the magnetic resonance force microscope according to Embodiment 3.

As shown in FIG. 21, in step S25-2, the 0°-output is fed back to the voltage-controlled variable-gain amplifier 43 to maintain the 0°-output from the phase detector 41 constant simultaneously with the above-described step S25-1. In this way, the gain of the voltage-controlled variable-gain amplifier 43 is adjusted.

In step S26, the feedback applied from the phase detector 41 to the scanner driver power supply 25 is stopped. The distance Z is scanned while holding the position (X, Y) stationary. Under this condition, the phase modulation intensity $\delta\phi$ at the point (X, Y, Z) is recorded. When the distance Z is scanned, if $\Delta\phi$ deviates greatly from 0, it is necessary to modify the frequency of the oscillator 42 to reduce the $\Delta\phi$ down to zero, using Eq. (4) as a reference.

In step S27, a decision is made as to whether the measurement range has been scanned completely over the positions (X, Y) requested. The process steps from the above-described steps S23 to S26 are repeated until the decision becomes affirmative (i.e., the scanning has been completed) to acquire three-dimensional data indicated by $\delta\phi$ (X, Y, Z). If the phase shift $\Delta\phi$ is recorded at the same time, a distribution of force gradients can be obtained.

In step S28, the AFM image is given as a curved plane (FIG. 9) that is given by $Z=Z_0$ (X, Y).

In step S29, a conversion is performed from magnetic resonance data $F_s$ (X Y, Z) to an MRFM image N (X, Y, Z) according to Eq. (13).

$$F_s(X, Y, Z) = \iiint_V dxdydz\, P(X-x, Y-y, Z-z)N(x, y, z) \quad (13)$$

Figure 22:
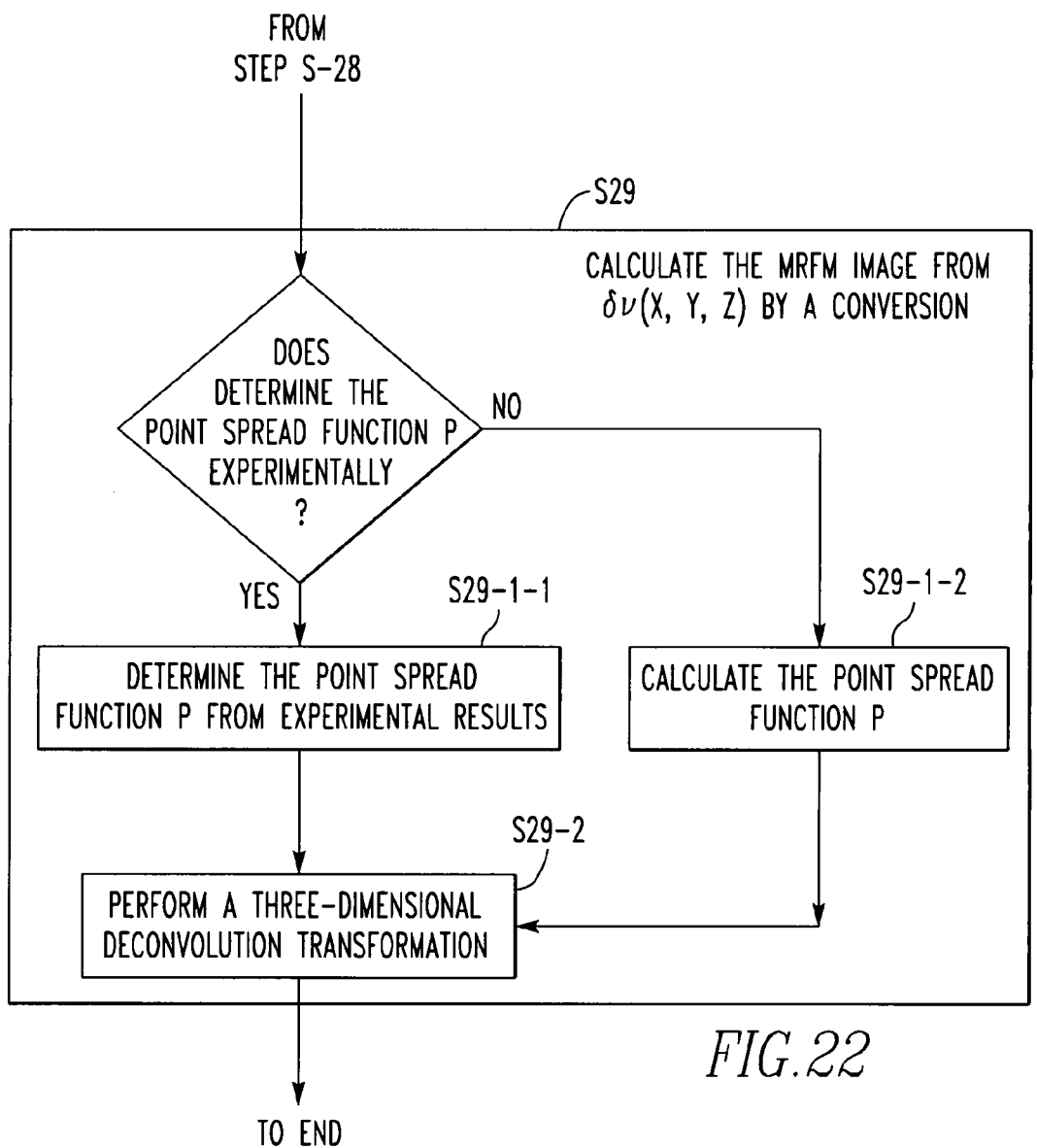
FIG. 22 is a partial enlarged flowchart illustrating the operation of the magnetic resonance force microscope according to Embodiment 3.

The conversion from $F_s$ to N is a three-dimensional deconvolution transform in which the point spread function is P. As shown in FIG. 22, the point spread function P is experimentally determined in step S29-1-1 or computationally determined in a work done in step S29-1-1'. The three-dimensional deconvolution transform is described in step S29-2.

In step S29-1-1, the point spread function is found. With respect to a sample (N (x, y, z)=$\delta$ (x, y, z)) that can be regarded as a mass point, when $F_s$ (X, Y, Z) is being measured experimentally, the point spread function is given by P (X, Y, Z)=$F_s$ (X, Y, Z).

When the distribution $B_z(\vec{r})$ of the magnetic field produced by the probe 24 is known, the point spread function is given by a calculation using Eq. (14) in step S29-1-1'.

$$P(\vec{r}) = \chi B_z(\vec{r}) \left(\frac{\partial H_\alpha(\vec{r'})}{\partial z'}\right)_{\vec{r'}=\vec{r}} \quad (14)$$

where $\chi$ is the spin magnetic susceptibility that is represented as a function of the magnetic field distribution $B_z(\vec{r})$, RF magnetic field intensity $B_1$, RF angular frequency $\omega$, and relaxation times $T_1$, $T_2$.

In step S29-2, an MRFM image can be calculated by three-dimensional deconvolution transform in the same way as in step S10 of Embodiment 1. However, Eq. (4) is used to perform a conversion from $\delta\phi$ to $\delta v$.

In summary, in the first embodiment, an atomic force microscope image is created from the component of a detection signal which indicates a frequency shift and does not vary in time. A magnetic resonance force microscope image is created from the component that varies in time.

In the second embodiment, an atomic force microscope image is created from the component of a detection signal which indicates a phase shift and which does not vary in time. A magnetic resonance force microscope image is created from the component which varies in time.

In each of the above-described embodiments, an atomic force microscope image and a magnetic resonance force microscope image are created from two components of a detection signal which indicate a frequency shift or phase shift which does not vary in time for the former image, while for the latter image does vary in time. The sources of information are not always required to be a component varying in time and a component not varying in time. An atomic force microscope image may be created from one Fourier component, and a magnetic resonance force microscope image may be created from other Fourier component.

In the third embodiment, an atomic force microscope image is created from a component of a detection signal which indicates a phase shift and which does not vary in time. A magnetic resonance force microscope image is created from a component of the detection signal which indicates the phase shift and which varies in time.

In the third embodiment, too, an atomic force microscope image can be created from one Fourier component of a detection signal which indicates a phase shift. A magnetic resonance force microscope image can be created from other Fourier component of the detection signal indicating the phase shift.

It is to be understood that the above embodiments are merely exemplary of the present invention and that the invention is not limited thereto.

Having thus described our invention with the detail and particularity required by the Patent Laws, what is desired protected by Letters Patent is set forth in the following claims.

The invention claimed is:

1. A magnetic resonance force microscope for performing magnetic resonance force imaging of a sample, said microscope comprising:

(A) a cantilever having a probe at its tip and acting to detect a displacement distance based on an interaction produced between the probe and a local portion of the sample;
(B) a scanner for scanning the sample relative to the probe of the cantilever, the sample being placed on the scanner;
(C) a cantilever displacement-measuring portion for converting the displacement distance of the cantilever into an electrical signal;
(D) a cantilever self-excitation loop portion for self-exciting the cantilever according to an output signal from the cantilever displacement-measuring portion;
(E) an RF magnetic field-producing portion for producing a homogeneous RF magnetic field over the whole of the sample scanned relative to the probe by the scanner;
(F) an RF signal source for causing the RF magnetic field-producing portion to produce an RF signal having a frequency adapted to excite magnetic resonance in the sample present in the magnetic field and to modulate the RF signal periodically;
(G) a modulation signal source for supplying the periodically modulated signal to the RF signal source;
(H) a frequency demodulation portion for (i) controlling spins in the sample to produce a magnetic resonance force while the cantilever self-excitation loop portion is self-exciting the cantilever in the RF magnetic field produced uniformly over the whole of the sample by the RF magnetic field-producing portion in response to the periodically modulated RF signal that is produced by the RF signal source based on the periodically modulated signal supplied from the modulation signal source, (ii) measuring the resonant frequency of the cantilever from the output signal from the cantilever displacement-measuring portion based on a gradient of the magnetic resonance force; and (iii) measuring a shift of the resonant frequency of the cantilever;
(I) an atomic force imaging portion for controlling the scanner such that a DC component of the amount of shift of the resonant frequency of the cantilever is kept constant to adjust the distance from the surface of the sample to the tip of the probe and to create an atomic force microscope image of the sample; and
(J) a magnetic resonance force imaging portion for creating a magnetic resonance force microscope image according to an AC component of the amount of shift of the resonant frequency of the cantilever in the frequency demodulation portion.

2. A magnetic resonance force microscope as set forth in claim 1, wherein the probe of said cantilever is made of a stage of a permanent magnet and a tip of a soft magnetic material, the tip being placed on the stage.

3. A magnetic resonance force microscope as set forth in claim 1, wherein the probe of said cantilever is made of any one of (i) a probe consisting of a stage made of a soft magnetic material and a tip of a soft magnetic material, the tip being placed on the stage, and (ii) a probe consisting only of a tip of a soft magnetic material having no stage, and wherein a magnetic field for magnetizing the probe is supplied from outside.

4. A magnetic resonance force microscope as set forth in any one of claims 2 and 3, wherein said soft magnetic material is at least one of iron, a soft ferrite (such as Mn—Zn ferrite or Ni—Zn ferrite), iron-silicon alloy, and iron-nickel alloy (Permalloy).

5. A magnetic resonance force microscope for performing magnetic resonance force imaging of a sample, said microscope comprising:

(A) a cantilever having a probe at its tip and acting to detect a displacement distance based on an interaction produced between the probe and a local portion of the sample;
(B) a scanner for scanning the sample relative to the probe of the cantilever, the sample being placed on the scanner;
(C) a cantilever displacement-measuring portion for converting the displacement distance of the cantilever into an electrical signal;
(D) a cantilever excitation portion for exciting the cantilever according to an output signal from the cantilever displacement-measuring portion;
(E) an RF magnetic field-producing portion for producing a homogeneous RF magnetic field over the whole of the sample scanned relative to the probe by the scanner;
(F) an RF signal source for causing the RF magnetic field-producing portion to produce an RF signal having a frequency adapted to excite magnetic resonance in the sample present in the magnetic field and to modulate the RF signal periodically;
(G) a modulation signal source for supplying the periodically modulated signal to the RF signal source;
(H) a phase detector for (i) controlling spins in the sample to produce a magnetic resonance force while the cantilever excitation portion is exciting the cantilever in the RF magnetic field produced uniformly over the whole of the sample by the RF magnetic field-producing portion in response to the periodically modulated RF signal that is produced by the RF signal source based on the periodically modulated signal supplied from the modulation signal source and (ii) measuring a phase shift of the cantilever from the output signal from the cantilever displacement-measuring portion based on a gradient of the magnetic resonance force;
(I) an atomic force imaging portion for controlling the scanner such that a DC component of the phase shift of the cantilever is kept constant to adjust the distance from the surface of the sample to the tip of the probe and to create an atomic force microscope image of the sample; and
(J) a magnetic resonance force imaging portion for creating a magnetic resonance force microscope image according to the phase modulation intensity of the cantilever.

6. A magnetic resonance force microscope as set forth in claim 5, wherein the probe of said cantilever is made of a stage of a permanent magnet and a tip of a soft magnetic material, the tip being placed on the stage.

7. A magnetic resonance force microscope as set forth in claim 5, wherein the probe of said cantilever is made of any one of (i) a probe consisting of a stage of a soft magnetic material and a tip of a soft magnetic material, the tip being placed on the stage, and (ii) a probe consisting only of a tip of a soft magnetic material having no stage, and wherein a magnetic field for magnetizing the probe is supplied from outside.

8. A magnetic resonance force microscope as set forth in any one of claims 6 and 7, wherein said soft magnetic material is at least one of iron, a soft ferrite (such as Mn—Zn ferrite or Ni—Zn ferrite), iron-silicon alloy, and iron-nickel alloy (Permalloy).

9. A magnetic resonance force microscope for performing magnetic resonance force imaging of a sample, said microscope comprising:

(A) a cantilever having a probe at its tip and acting to detect a displacement distance based on an interaction produced between the probe and a local portion of the sample;

(B) a scanner for scanning the sample relative to the probe of the cantilever, the sample being placed on the scanner;

(C) a cantilever displacement-measuring portion for converting the displacement distance of the cantilever into an electrical signal;

(D) a cantilever excitation portion for exciting the cantilever according to an output signal from the cantilever displacement-measuring portion;

(E) an RF magnetic field-producing portion for producing a homogeneous RF magnetic field over the whole of the sample scanned relative to the probe by the scanner;

(F) an RF signal source for causing the RF magnetic field-producing portion to produce an RF signal having a frequency adapted to excite magnetic resonance in the sample present in the magnetic field and to modulate the RF signal periodically;

(G) a modulation signal source for supplying the periodically modulated signal to the RF signal source;

(H) a phase detector for (i) controlling spins in the sample to produce a magnetic resonance force while the cantilever excitation portion is exciting the cantilever in the RF magnetic field produced uniformly over the whole of the sample by the RF magnetic field-producing portion in response to the periodically modulated RF signal that is produced by the RF signal source based on the periodically modulated signal supplied from the modulation signal source and (ii) measuring a phase shift of oscillation of the cantilever from the output signal from the cantilever displacement-measuring portion based on the magnetic resonance force;

(I) an atomic force imaging portion for controlling the scanner such that a DC component of the amount of the phase shift of the cantilever is kept constant to adjust the distance from the surface of the sample to the tip of the probe and to create an atomic force microscope image of the sample; and (J) a magnetic resonance force imaging portion for creating a magnetic resonance force microscope image according to a phase modulation intensity of the cantilever.

10. A magnetic resonance force microscope as set forth in claim 9, wherein the probe of said cantilever is made of a stage of a permanent magnet and a tip of a soft magnetic material, the tip being placed on the stage.

11. A magnetic resonance force microscope as set forth in claim 9, wherein the probe of said cantilever is made of any one of (i) a probe consisting of a stage of a soft magnetic material and a tip of a soft magnetic material, the tip being placed on the stage, and (ii) a probe consisting only of a tip of a soft magnetic material having no stage, and wherein a magnetic field for magnetizing the probe is supplied from outside.

12. A magnetic resonance force microscope as set forth in any one of claims 10 and 11, wherein said soft magnetic material is at least one of iron, a soft ferrite (such as Mn—Zn ferrite or Ni—Zn ferrite), iron-silicon alloy, and iron-nickel alloy (Permalloy).

* * * * *

UNITED STATES PATENT AND TRADEMARK OFFICE
CERTIFICATE OF CORRECTION

PATENT NO. : 7,400,144 B2  Page 1 of 1
APPLICATION NO. : 11/712840
DATED : July 15, 2008
INVENTOR(S) : Tsuji et al.

It is certified that error appears in the above-identified patent and that said Letters Patent is hereby corrected as shown below:

<u>Face of the Patent</u>, See Item (73) Assignee, add the second and third Assignees:

-- Kyoto University, Kyoto (JP) and
 Yokohama City University, Kanagawa (JP) --

Signed and Sealed this

Ninth Day of June, 2009

JOHN DOLL
*Acting Director of the United States Patent and Trademark Office*